(12) United States Patent
Matsumoto

(10) Patent No.: US 11,713,052 B2
(45) Date of Patent: Aug. 1, 2023

(54) DRIVING ASSISTANCE APPARATUS AND DRIVING ASSISTANCE METHOD

(71) Applicant: Hatanoganshoudoushoten Co., Ltd., Tokyo (JP)

(72) Inventor: Tadashi Matsumoto, Tokyo (JP)

(73) Assignee: Hatanoganshoudoushoten Co., Ltd., Tokyo (JP)

( * ) Notice: Subject to any disclaimer, the term of this patent is extended or adjusted under 35 U.S.C. 154(b) by 114 days.

(21) Appl. No.: 16/681,824

(22) Filed: Nov. 13, 2019

(65) Prior Publication Data

US 2020/0079398 A1 Mar. 12, 2020

Related U.S. Application Data

(63) Continuation of application No. PCT/JP2017/026742, filed on Jul. 24, 2017.

(51) Int. Cl.
*B60W 50/10* (2012.01)
*B60W 40/09* (2012.01)
*B60W 40/105* (2012.01)
*B60W 50/00* (2006.01)

(52) U.S. Cl.
CPC ........... *B60W 50/10* (2013.01); *B60W 40/09* (2013.01); *B60W 40/105* (2013.01); *B60W 2050/007* (2013.01)

(58) Field of Classification Search
CPC combination set(s) only.
See application file for complete search history.

(56) References Cited

U.S. PATENT DOCUMENTS

| | | | |
|---|---|---|---|
| 6,928,350 B2 * | 8/2005 | Melnyk | B60R 25/252 400/489 |
| 7,970,514 B2 * | 6/2011 | Aeberhard | B60W 10/20 180/315 |
| 8,433,470 B1 * | 4/2013 | Szybalski | G06F 3/04842 701/41 |
| 10,331,127 B2 * | 6/2019 | Oba | B60W 30/182 |

(Continued)

FOREIGN PATENT DOCUMENTS

| | | |
|---|---|---|
| JP | 2010-123064 A | 6/2010 |
| JP | 2015-185088 A | 10/2015 |

(Continued)

OTHER PUBLICATIONS

International Search Report for PCT/JP2017/026742 dated Sep. 26, 2017.
PCT written opinion dated Sep. 26, 2017.

*Primary Examiner* — Jeff A Burke
*Assistant Examiner* — Madison B Emmett
(74) *Attorney, Agent, or Firm* — Yokoi & Co., U.S.A.; Toshiyuki Yokoi

(57) ABSTRACT

A passenger car that has a function of being able to partially or fully drive, not in accordance with driver's intentions, includes a grip that is provided independent of an operation system of the passenger car and is configured to receive driver's operating intentions according to operation of the driver, and a control unit that is configured to determine whether a driver's operating intention has been changed to another intention via the grip and to determine, when the operating intention has been changed, whether to give an operating initiative to the driver.

6 Claims, 18 Drawing Sheets

(56) References Cited

U.S. PATENT DOCUMENTS

| | | | | |
|---|---|---|---|---|
| 2003/0055538 A1* | 3/2003 | Yanaka | ............... | B60L 15/10 701/1 |
| 2003/0141133 A1* | 7/2003 | Yanaka | ............... | G05G 5/03 180/315 |
| 2003/0173136 A1* | 9/2003 | Kapaan | ............... | G05G 9/047 180/321 |
| 2004/0002405 A1* | 1/2004 | Laukkanen | ............... | G05G 1/04 477/209 |
| 2006/0118350 A1* | 6/2006 | Suyama | ............... | B62D 1/046 180/332 |
| 2009/0030582 A1* | 1/2009 | Jacobi | ............... | B60K 26/021 701/51 |
| 2009/0225027 A1* | 9/2009 | Itoh | ............... | G05G 9/047 345/161 |
| 2013/0327174 A1* | 12/2013 | Jun | ............... | G05G 9/02 74/482 |
| 2015/0006014 A1* | 1/2015 | Wimmer | ............... | B60W 50/00 701/23 |
| 2015/0210272 A1* | 7/2015 | Edgren | ............... | B60W 50/10 701/23 |
| 2016/0009174 A1* | 1/2016 | Yamauchi | ............... | G05G 1/62 74/473.3 |
| 2016/0090103 A1* | 3/2016 | Tan | ............... | G06F 3/016 345/156 |
| 2016/0187879 A1 | 6/2016 | Mere et al. | | |
| 2016/0207577 A1* | 7/2016 | Pang | ............... | B62D 39/00 |
| 2016/0264021 A1* | 9/2016 | Gillett | ............... | B60L 8/00 |
| 2016/0280236 A1 | 9/2016 | Otsuka | | |
| 2018/0113461 A1* | 4/2018 | Potnis | ............... | B60W 50/00 |
| 2018/0126986 A1* | 5/2018 | Kim | ............... | B60W 50/087 |
| 2018/0194349 A1* | 7/2018 | McGill, Jr. | ............... | B60W 30/10 |

FOREIGN PATENT DOCUMENTS

| | | |
|---|---|---|
| JP | 2016-115356 A | 6/2016 |
| JP | 2016-124542 A | 7/2016 |
| JP | 2016-175613 A | 10/2016 |

\* cited by examiner

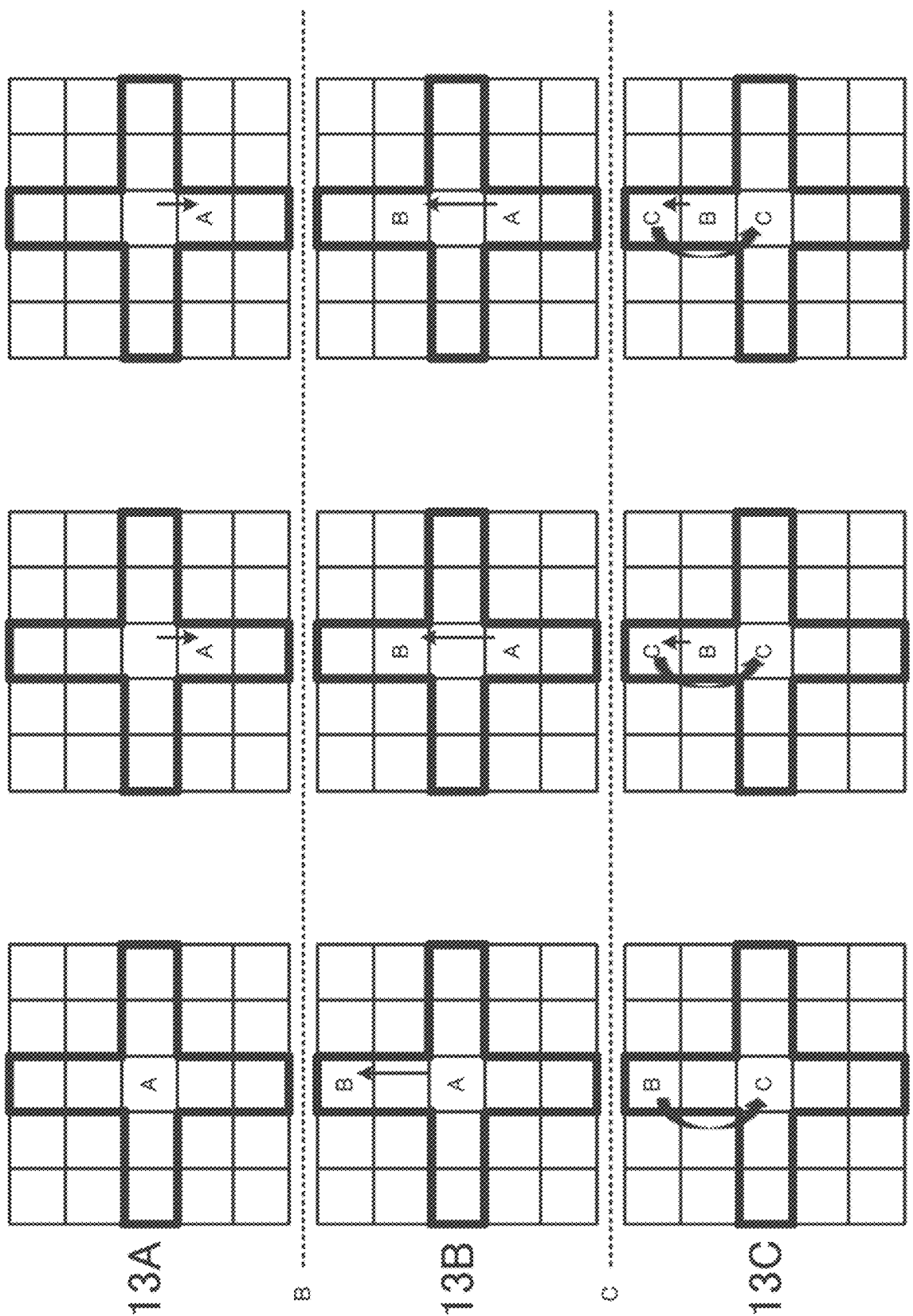

| TIME AXIS | T | BRAKING | NEUTRAL | HEADING | LEFT TURN | NEUTRAL | RIGHT TURN |
|---|---|---|---|---|---|---|---|
| PRESENT | T | | | 2 | | 0 | |
| −0.2 seconds | T1 | | | 1 | | | 1 |
| −0.4 seconds | T2 | | 0 | | | | 1 |
| −0.6 seconds | T3 | 1 | | | | 0 | |
| −0.8 seconds | T4 | | 0 | | 1 | | |
| −1 second | T5 | | 0 | | 2 | | |
| −1.2 second | T6 | 1 | | | 3 | | |
| −1.4 seconds | T7 | 2 | | | 2 | | |
| −1.6 seconds | T8 | 1 | | | 1 | | |
| −1.8 seconds | T9 | | 0 | | | 0 | |
| −2 seconds | T10 | | | 1 | | 0 | |

DRIVING ASSISTANCE APPARATUS AND DRIVING ASSISTANCE METHOD

CROSS-REFERENCE TO RELATED APPLICATIONS

This application is a continuation application of International Application PCT/JP2017/026742 filed on Jul. 24, 2017, designating the U.S. The entire contents of both foregoing applications are incorporated herein by reference.

FIELD OF THE INVENTION

The embodiments discussed herein relate to a driving assistance apparatus and a driving assistance method.

BACKGROUND OF THE INVENTION

For vehicle driving control, there has been known a technique of confirming whether a driver's condition allows switching from automated to manual driving control.

For example, there is known an apparatus that includes a visual-confirmation-activity determination unit for determining a visual-confirmation activity to be taken by the driver of an automated driving vehicle to confirm whether the driver's condition allows switching from automated to manual driving control, a visual-confirmation-activity control unit for causing the driver to take the determined visual-confirmation activity, and a driver analysis unit for detecting the visual-confirmation activity taken by the driver.

Please see, for example, Japanese Laid-open Patent Publications Nos. 2015-185088 and 2016-1224542.

While a vehicle drives under automated driving control, the driver may want to switch the control mode from the automated to the manual driving control in order to avoid a sudden accident. However, there may be cases where it is better to switch the control mode to the manual driving control, but there may also be cases where it is better to keep the automated driving control. In addition, even while the driver manually drives the vehicle, there may be cases where the automated driving control is considered to provide more safety driving. Either way, it is needed to measure driver's driving awareness.

SUMMARY OF THE INVENTION

According to one aspect, there is provided a driving assistance apparatus provided in a transportation entity that has a control function of being able to partially or fully drive, not in accordance with an operating intention of a driver who monitors the transportation entity. The driving assistance apparatus includes: an operation unit that is not interlocked with an operation system that actually operates the transportation entity, is provided independent of the operation system, and is configured to receive the operating intention of the driver according to operation of the driver while the transportation entity moves; and a control unit that is configured to continuously measure a transition process of changing the operating intention of the driver to a different intention via the operation unit, and to determine whether to give the driver an initiative of actually operating the transportation entity, based on a measurement value indicating a change to the different intention, wherein the operation unit notifies the control unit that an increase in a number of steps by which the driver tilts the operation unit in a direction of heading indicates an increase in an intention of the driver to accelerate the transportation entity, and the control unit determines that the driver has an intention of keeping a current speed upon recognizing that the operation unit stays at a neutral position while the transportation entity is accelerating.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 13A, 13B, and 13C are views for explaining a driver's driving intention, a swing pressure of a sensor, and driving steering of a control unit at each position illustrated in FIG. 12.

FIG. 15 illustrates a table that has a time axis in addition to coordinate axes of an image sensor.

FIG. 16 illustrates positions displayed in terms of heading, braking, right-rotation, and left-rotation levels with respect to the time axis.

DETAILED DESCRIPTION OF THE INVENTION

Hereinafter, a passenger car according to preferred embodiments will be described in detail with reference to the accompanying drawings.

First Embodiment

Figure 1:
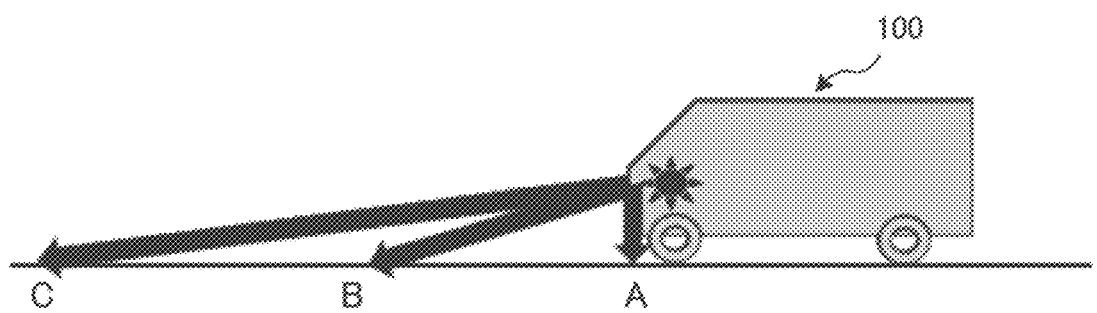
FIG. 1 illustrates a passenger car according to a first embodiment.

FIG. 1 illustrates a passenger car according to a first embodiment.

The passenger car 100 of this embodiment is one example of a transportation entity. Transportation entities are not limited to any particular type, and examples of such transportation entities include, in addition to passenger cars, cargo vehicles, ships, and airplanes, which are manipulated by humans. The passenger car 100 has a function (so-called driving assistance function) of being able to partially or fully drive, not in accordance with driver's operating intentions. For example, the passenger car 100 has a function of automatically starting to drive and stopping in response to detection of a car ahead. The passenger car 100 also has a function of automatically driving all the way to a driver-designated destination.

The driver of the passenger car 100 has "driving intentions" to go to the destination. The driving assistance apparatus provided in the passenger car 100 is able to recognize and quantify the driver's driving intentions (driving awareness and driving mind). The driving assistance here means assistance to both humans and the control unit that controls automated driving.

For example, a driving intention includes the following elements: a traveling direction, a driving speed, and stopping for safety. During manual driving, the driver conveys his/her intentions to the passenger car 100 by manipulating the steering wheel, gas pedal, and brake petal with his/her hands and feet. In this embodiment, the passenger car 100 is provided with a grip as a means (operation unit) for use by the driver to convey his/her intentions. The grip will be described in detail later.

The grip enables the driver to convey to the passenger car 100 his/her intentions, such as a sharp turn, a gentle turn, a turning direction, acceleration, deceleration, stopping, keeping on driving, and others. Please note that the grip is not interlocked with an apparatus (operation system) that actually controls driving and steering of the passenger car 100. The passenger car 100 quantifies an intention received via the grip and determines the driver's driving intention.

To explain driving intentions, the following example uses an image in which the passenger car 100 emits a frequency with high directivity, such as laser light in the forward direction.

In FIG. 1, a position A is a place where the passenger car 100 driving at a speed of 0 km/h reaches after one second. A position B is a place where the passenger car 100 driving at a speed of 40 km/h reaches after one second (this position is away from the position A by 1.11 m). A position C is a place where the passenger car 100 driving at a speed of 80 km/h reaches after one second (this position is away from the position A by 22.22 m).

Figure 2A:
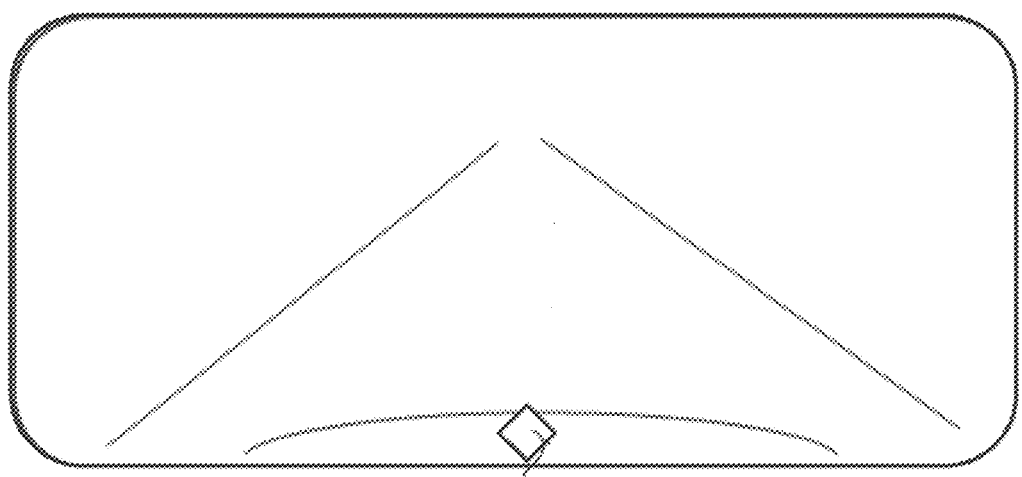
FIGS. 2A to 2C exemplify images of a view from the passenger car through the front windshield.
Figure 2B:
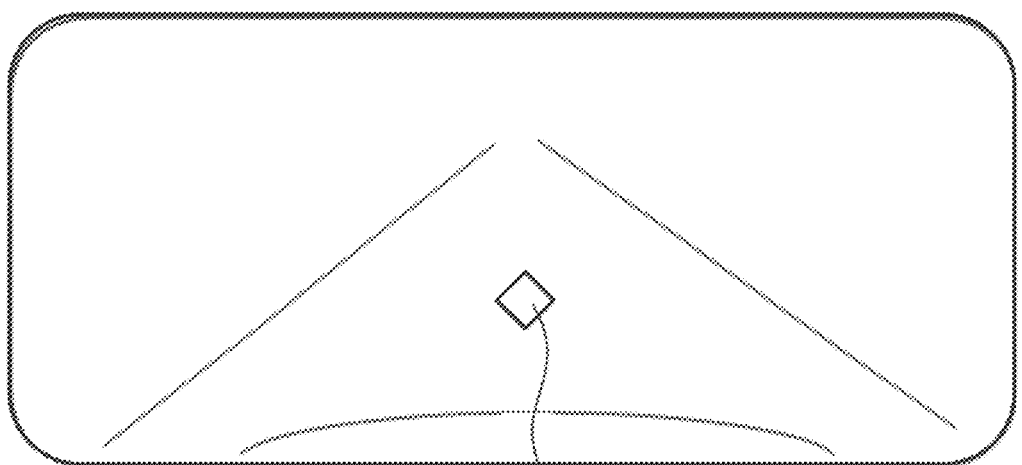
Figure 2C:
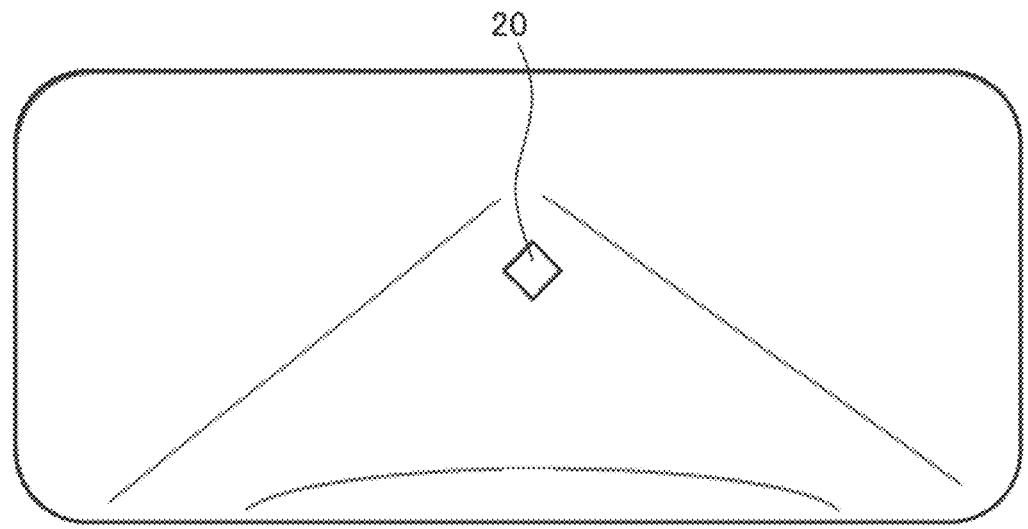

FIGS. 2A to 2C exemplify images of a view from the passenger car through the front windshield.

Each of the exemplified images is that the passenger car 100 displays, with a so-called head-up display or another function, an index 20 indicating a position where the passenger car 100 will reach after one second according to a current driving speed per hour, on the front windshield.

The index 20 in FIG. 2A indicates a position (that is, the position A in FIG. 1) where the passenger car 100 driving at a speed of 0 km/h reaches after one second. The index 20 in FIG. 2B indicates a position (that is, the position B in FIG. 1) where the passenger car 100 driving at a speed of 40 km/h reaches after one second. The index 20 in FIG. 2C indicates a position (that is, the position C in FIG. 1) where the passenger car 100 driving at a speed of 80 km/h reaches after one second.

Figure 3:
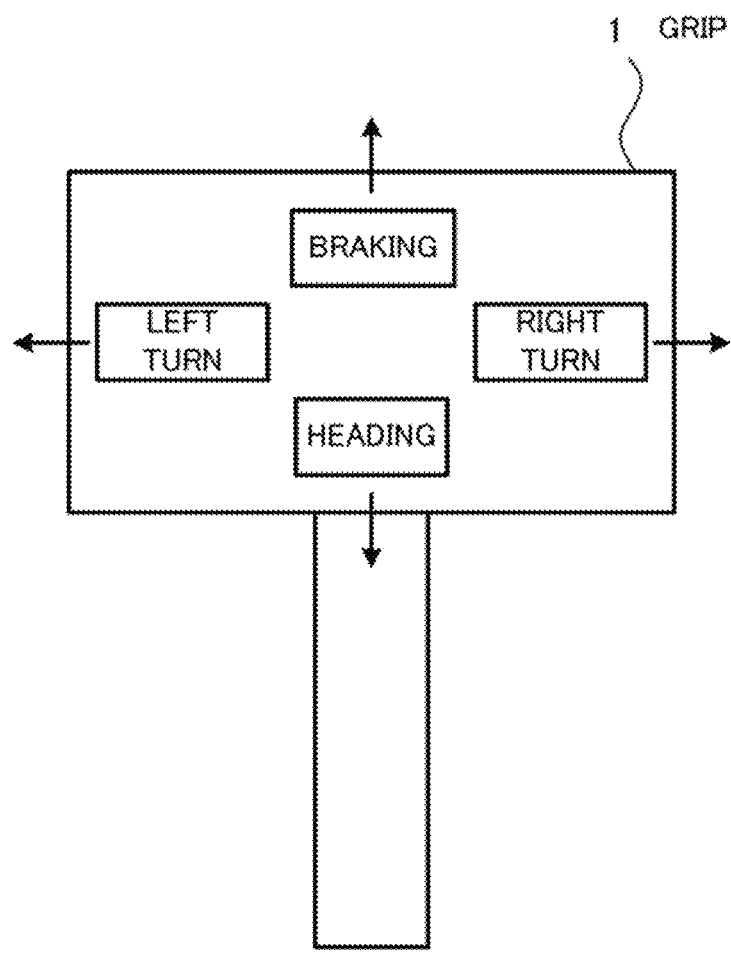
FIG. 3 is a view for explaining operation of a grip.

FIG. 3 is a view for explaining a grip according to the embodiment.

The grip 1 may be provided in a foldable manner at the tip of a left or right armrest in the passenger car 100. Alternatively, the grip 1 may be incorporated with a gear change function in the gear shift lever of an automatic transmission car. In this case, the grip 1 preferably has a position lock mechanism in order to prevent confusion between an operation for conveying driving intentions and an operation for gear change.

The driver is able to hold a movable part of the grip 1 with his/her hand and desirably tilt the grip 1 forward, backward, to the left, and to the right (i.e., in 360 degrees) within a range of image pickup angles of a fisheye lens or the like provided in an image pickup element (to be described later). The grip 1 may be configured such as to enable the driver to feel, at his/her palm, resistance caused by stepwise movements, i.e., the feeling of notches, by holding and moving the grip 1 forward, backward, to the left, and to the right.

While the driver does not hold the movable part of the grip 1, the movable part stays at a position which is a neutral position for the left and right steering and a neutral position for the heading control. A connecting part between the movable part of the grip 1 and its angle adjustment device may be formed of an elastic movable material to protect human bodies in case of car collision.

In the present embodiment, "braking" is set by the driver tilting the grip 1 away from the driver (upper direction in FIG. 3), "heading" is set by the driver tilting the grip 1 toward the driver (lower direction in FIG. 3), "left turn" is set by the driver tilting the grip 1 to the left, and "right turn" is set by the driver tiling the grip 1 to the right. The "heading" is set by the backward tilting, because a motorcycle is accelerated by rotating its handle grip toward a rider. When a thrust force is actually applied to the passenger car 100, a backward inertial force caused by the acceleration acts on a human body. Therefore, the above setting is a natural thing.

In this connection, the above pattern of the moving and tilting directions is just an example, and, for example, the "heading" and "braking" may be set in directions opposite to those illustrated in FIG. 3.

When the grip 1 is tilted from the neutral position (as illustrated in FIG. 3) in any one direction, the position of the grip 1 is taken as a start point. In addition, when the grip 1 tilted in one direction is released, its movable part returns back to the neutral position.

The grip 1 may be configured so as to provide a plurality of steps (five steps of tilt in the present embodiment) in each direction, like the master controller of a train.

The grip 1 supplies values corresponding to a tilt in the four directions to the control unit. An image of the tilt and rotation of the grip 1 is picked-up by the image pickup element (to be described later), and are quantified by the control unit. A quantified signal is converted into values on coordinate axes representing six elements of driver's intentions: left steering and right steering, heading and braking, and their respective neutral positions, and then the values are stored as data in a storage unit (to be described later).

The driver is able to appropriately tilt the grip 1 unconsciously, as in the case where the driver appropriately rotates the steering wheel unconsciously during manual driving. In this connection, the driver tilts the grip 1 by a tilt angle according to driver's sense of driving. Even with the tilt angle based on such an indefinite basis, a driver's driving intention is conveyed to the control unit with two appropriate values.

One is an angular value representing a desired traveling direction, and the other is a value representing an intention change point where the tilt operation was changed from one direction to its opposite direction. Such a change occurs each time the grip 1 is moved.

As in the operation for heading and braking, the driver tilts the grip 1 to the left or right at each curve of roads. Each time the traveling direction is switched to the left or right, the control unit records the direction angle and the start point and end point determined by the intention change. The control unit is considered to recognize the reason for the intention change (for example, red or green traffic light, pedestrians, a left curve, a right curve, or another), with sensors provided in the car body and a program trained by deep learning, which are provided for automated driving. In this way, the control unit measures the reliability of the driver that takes a role of monitoring the passenger car 100. In addition, the control unit is able to interact with the driver and to receive advice from the driver (for example, if a highly-reliable driver suddenly tilts a grip in the direction of braking, the control unit is able to recognize that some danger will happen). Such an effect is obtained by comparing the measurement value of a driving intention entered via the grip 1 with a measurement value obtained by a Gyro sensor or acceleration sensor provided in the transportation means. Humans themselves are considered as very sensitive sensors. The automated driving car, which is a machine, converts a measurement value obtained from such a human sensor into numerical data, image data, linear data, or another using the control unit (to be described later), and makes a comparison.

The following describes control of the passenger car 100 in detail.

Figure 4:
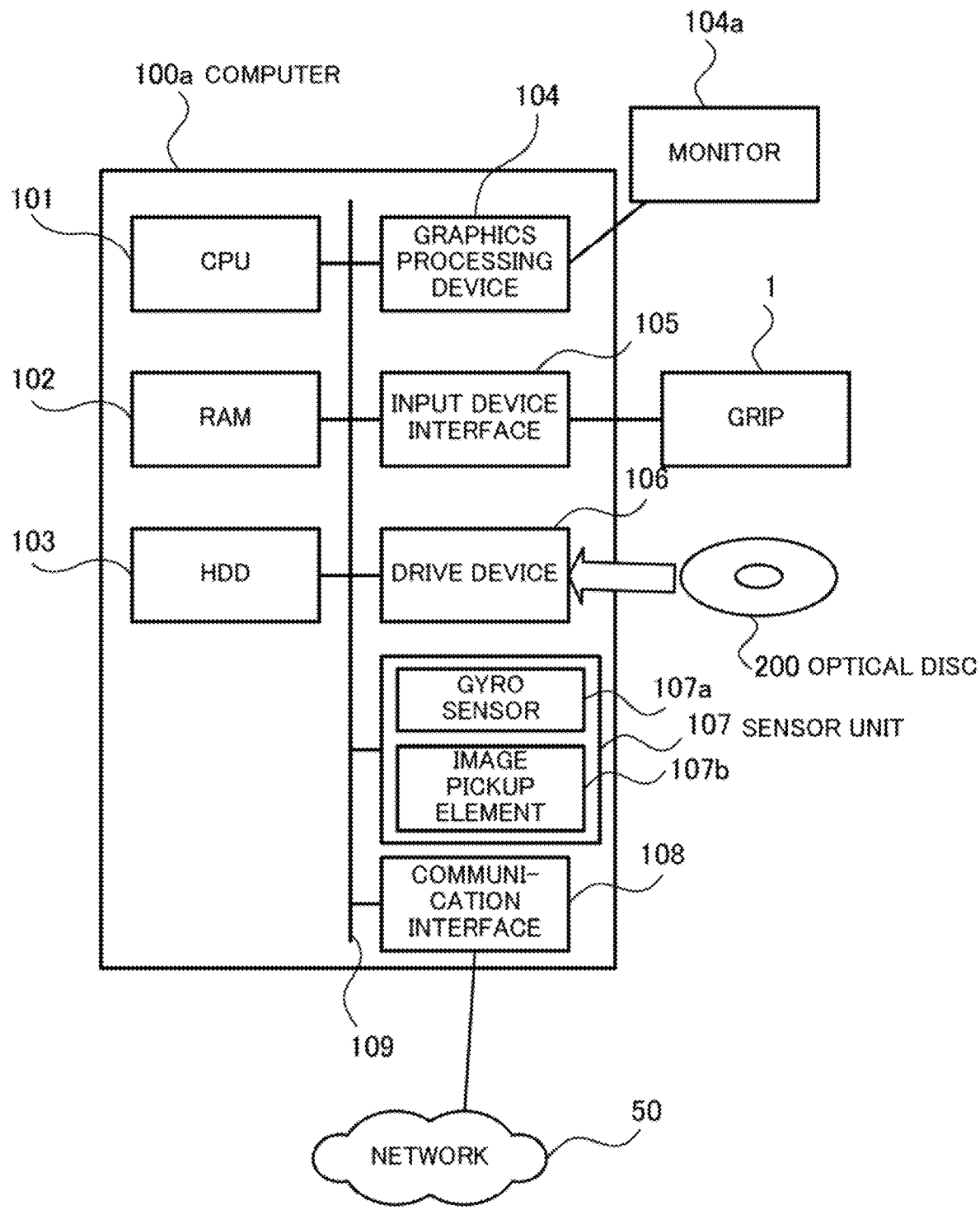
FIG. 4 is a view for explaining a hardware configuration of a computer provided in the passenger car.

FIG. 4 is a view for explaining a hardware configuration of a computer provided in the passenger car.

The computer (driving assistance apparatus) 100*a* is entirely controlled by a central processing unit (CPU) 101. Connected to the CPU 101 via a bus 109 are a random access memory (RAM) 102 and a plurality of peripheral devices.

The RAM 102 is used as a main storage device of the computer 100*a*. The RAM 102 temporarily stores therein at least part of operating system (OS) programs and application programs that are executed by the CPU 101. Also, the RAM 102 stores therein various kinds of data to be used by the CPU 101 in processing.

Connected to the bus 109 are a hard disk drive (HDD) 103, a graphics processing device 104, an input device interface 105, a drive device 106, a sensor unit 107, and a communication interface 108.

The HDD 103 magnetically writes and reads data on a built-in disk. The HDD 103 is used as an auxiliary storage device of the computer 100*a*. The HDD 103 stores therein the OS programs, application programs, and various kinds of data. A semiconductor storage device, such as a flash memory, may be used as the auxiliary storage device.

The graphics processing device 104 is connected to a monitor 104*a*. The graphics processing device 104 displays images on a screen of the monitor 104*a* in accordance with instructions from the CPU 101. Examples of the monitor 104*a* include a cathode ray tube (CRT) display, a liquid crystal display, and others.

The input device interface 105 transfers signals received from the grip 1 or other pointing devices to the CPU 101. Examples of the pointing devices include touch panels, tablets, touchpads, track balls, and others, in addition to the grip 1.

The drive device 106 performs data read on an optical disc on which data is recorded such as to be readable with reflection of light, a portable recording medium, such as a universal serial bus (USB) memory, for example. For example, in the case where the drive device 106 is an optical drive device, the drive device 106 reads data recorded on an optical disc 200 with laser light or the like. Examples of the optical disc 200 include Blu-ray (registered trademark), digital versatile disc (DVD), DVD-RAM, compact disc read only memory (CD-ROM), compact disc-recordable (CD-R), compact disc-rewritable (CD-RW), and others.

The sensor unit 107 includes a Gyro sensor 107*a* and an image pickup element 107*b*. The Gyro sensor 107*a* detects the current acceleration of the passenger car 100. In this connection, an acceleration sensor may be used, instead of the Gyro sensor 107*a*. Alternatively, both the Gyro sensor 107*a* and the acceleration sensor may be used.

The image pickup element 107*b* is mounted at a fixed position so as to face the movable part of the grip 1.

The image pickup element 107*b* is a CCD or CMOS, for example, and takes an image of the direction in which the operation unit provided in the grip 1 is moved. The operation unit will be described later. The image taken by the image pickup element 107*b* is sent to the CPU 101. The CPU 101 computerizes the imaged position of the grip 1.

The communication interface 108 is connected to a network 50. The communication interface 108 communicates data with another computer or communication device over the network 50.

With the above hardware configuration, the processing functions of the present embodiment may be implemented.

Figure 5A:
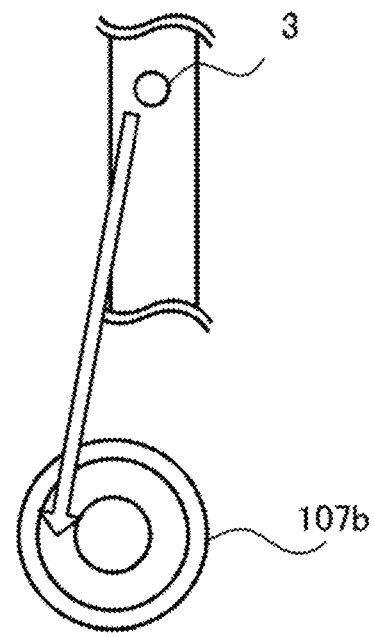
FIGS. 5A and 5B are views for explaining the configuration of an operation unit.
Figure 5B:
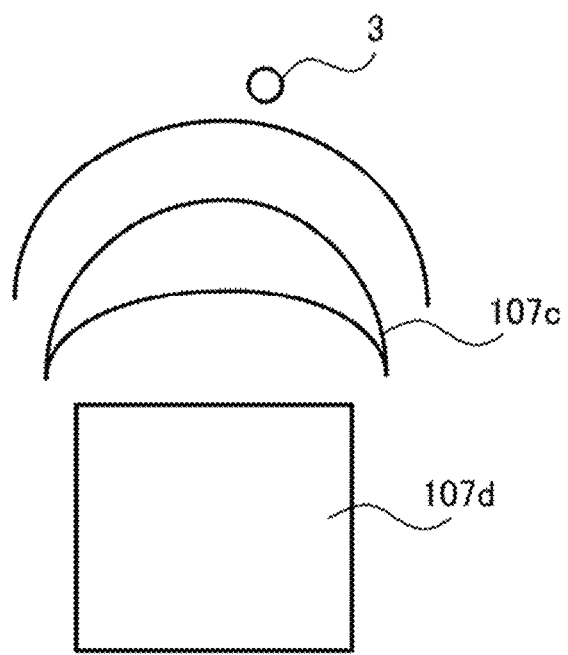

FIGS. 5A and 5B are views for explaining the configuration of the operation unit.

FIG. 5A is a view illustrating a situation where a light source of the operation unit 3 emits light to the image pickup element 107*b*, whereas FIG. 5B illustrates a light receiving unit viewed from the side.

The operation unit 3 is hemispherical. At the outer surface of the operation unit 3, LED light with strong straight traveling property is emitted. The light beams passing through a fisheye lens 107*c* travel to an image sensor 107*d* provided in the image pickup element 107*b*.

The CPU 101 records the current relative position of the operation unit 3 in position meshes in a grid.

Figure 6:
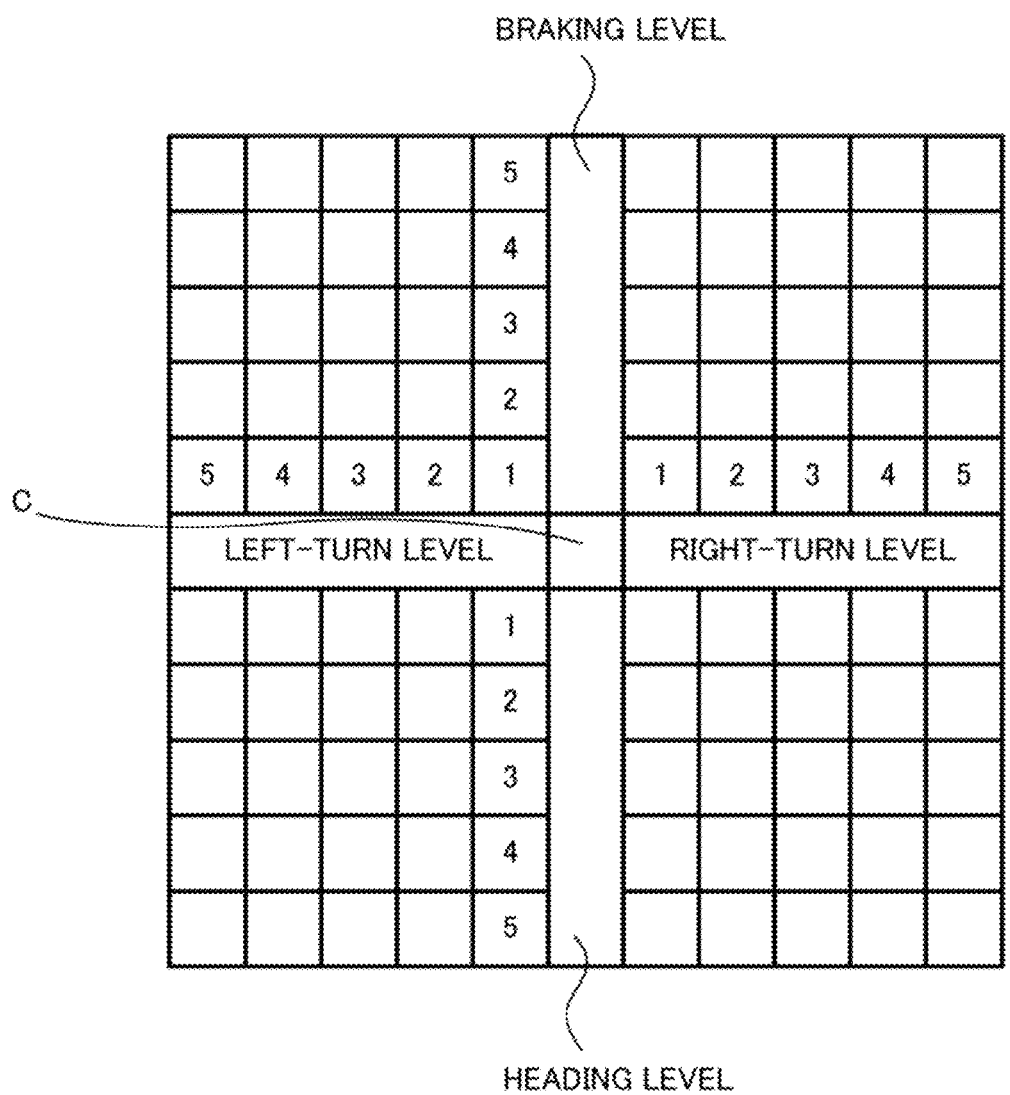
FIG. 6 is a view for explaining the position of the operation unit.

FIG. 6 is a view for explaining the position of the operation unit.

An image obtained through the fisheye lens 107*c* is circular with its outer peripheral area narrowed, but because the image is converted into a two-dimensional plan image, its outer peripheral area is enlarged and its center area is reduced in size.

As illustrated in FIG. 6, the current driver's driving intention is converted to a point by detecting the position of the operation unit 3. Each time the position of the operation unit 3 is detected, the control unit 11 adds time information indicating the detection time of the position.

The mechanism of the grip 1 is such that the light is positioned at the neutral position C while the driver does not touch the grip 1. To this end, a ring-shaped spring may be inserted between the movable outer portion and a stick portion that supports the grip 1.

Further, a liquid crystal display is provided on the inner surface of the hemispherical light source portion. A view that is seen from the driver's eyes is displayed on the display, so that the image pickup element 107*b* takes an image of a position that is to be reached after prescribed seconds in a direction in which the driver desires to move. The position is computed by the CPU 101 on the basis of the driving speed and the steering angle. A semitransparent image of the own car several seconds later may be recorded in the video of a drive recorder. The use of this image as a training correct data material for deep learning makes it possible to always update the program by learning own driving intentions and to share the program with other vehicles.

In this connection, a plurality of image pickup elements 107b may be provided. For example, in the case of reading driver's intentions regarding the left and right directions and driver's intentions regarding the heading and braking separately, two image pickup elements 107b may be provided.

Figure 7:
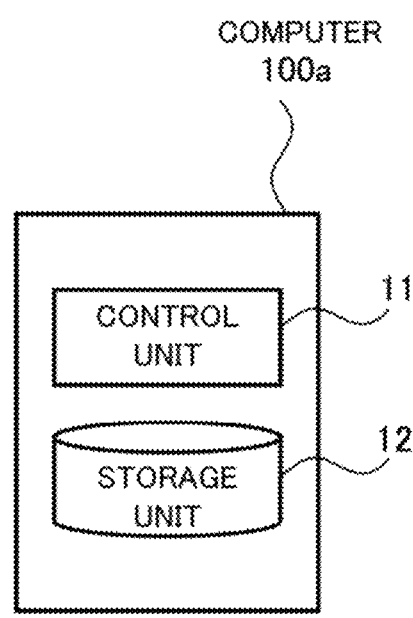
FIG. 7 is a block diagram illustrating functions of the computer according to the embodiment.

FIG. 7 is a block diagram illustrating functions of the computer according to the embodiment.

The computer 100a includes a control unit 11 and a storage unit 12.

The control unit 11 controls the passenger car 100. This control unit 11 enables the passenger car 100 to drive on a road, without driver's manual operations. Here, conventionally known functions of the control unit 11 for automated driving may be employed.

In addition, the control unit 11 detects, from the current operating state of the grip 1, the moment at which the grip 1 is moved in an opposite direction or in one direction. This moment is considered to be the time when human's determination based on his/her driving intention appears the most.

Then, the control unit 11 determines the driver's awareness level on the basis of the operating state of the grip 1 and determines whether to accept the driver's operation. This determination is made by a log record in which a swing pressure has occurred in the same positional direction and a completed movement continues. Depending on the determination, the control unit 11 allows operating a manual driving apparatus in accordance with driver's intentions even during the automated driving mode.

The driver is able to recognize the surrounding conditions and to take, in his/her brain, information that cannot be measured by sensors mounted in a limited space of the passenger car 100. For example, when the driver is just behind a large-sized container truck and waits for a traffic light, the driver may be able to recognize through a shop window on the street that the traffic light has turned green and a vehicle in front of the container truck has started to drive. By tilting the grip 1 in the direction of heading at this time, it is possible to record the drive start information in the coordinate axes earlier than the control unit 11. By the control unit 11 exercising drive start control after several seconds and also the acceleration sensor of the vehicle recording a swing pressure at the same time, the control unit 11 is able to determine that the driver recognizes the surrounding conditions correctly.

The storage unit 12 stores therein computation results obtained by the control unit 11. In addition, the storage unit 12 may store therein driver's awareness levels.

The following describes operations that are performed for heading, braking, left turn, and right turn.

(Operation for Heading)

Figure 8A:
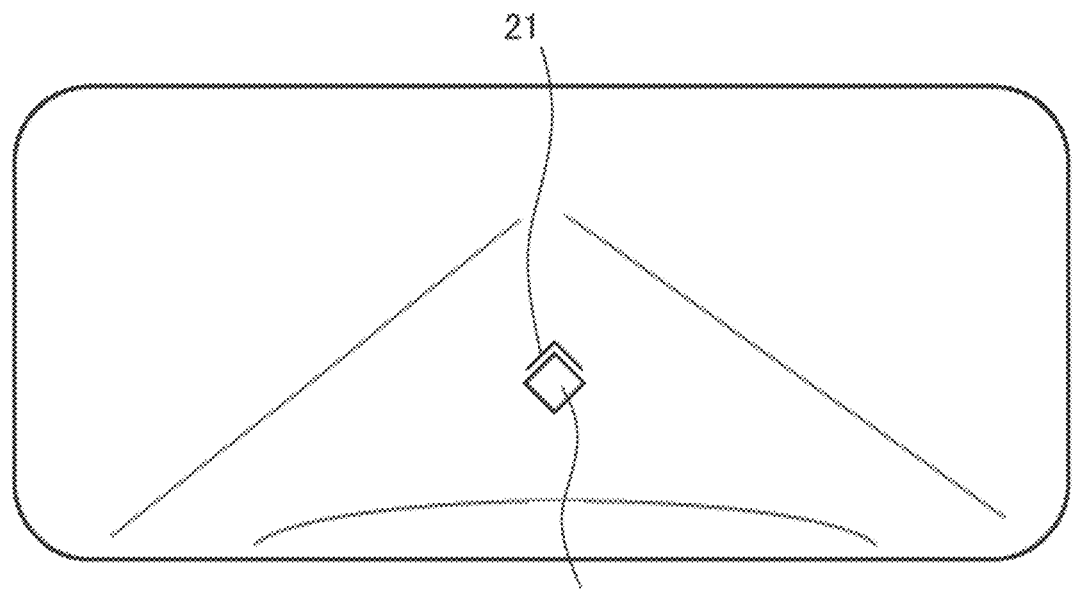
FIGS. 8A and 8B are views for explaining position mark information that is displayed on the front windshield when the grip is tilted in a direction of heading.
Figure 8B:
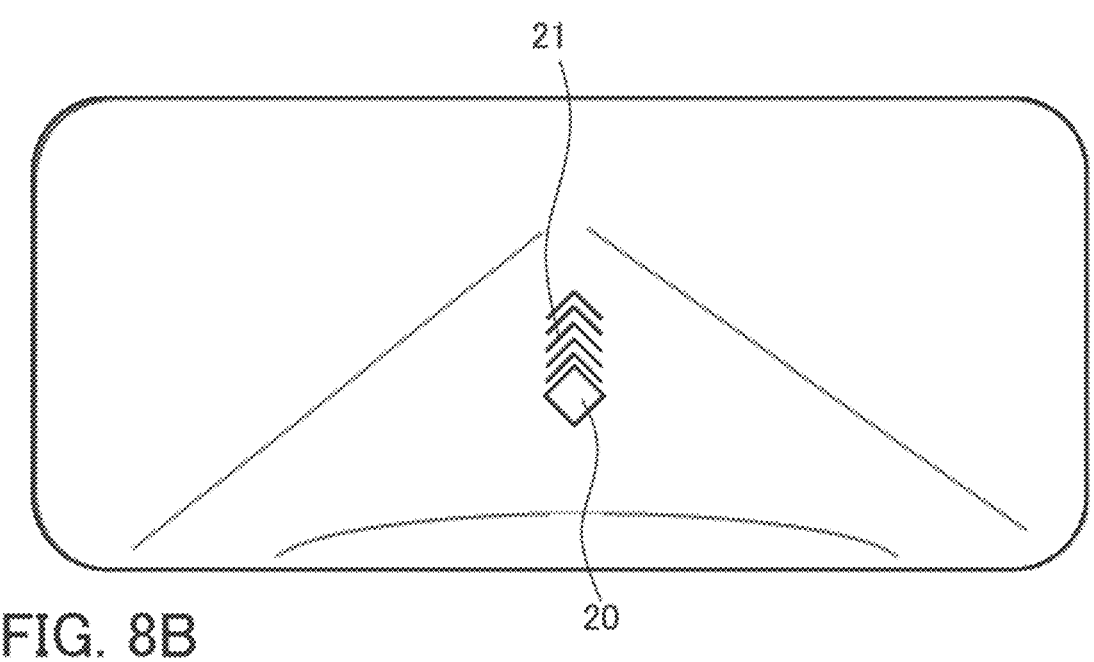

FIGS. 8A and 8B are views for explaining position mark information that is displayed on the front windshield when the grip is tilted in the direction of heading.

For example, as illustrated in FIG. 8A, when the driver tilts the grip 1 by one step in the direction of heading while the passenger car 100 drives at 40 km/h, one mark 21 is displayed above an index 20 displayed on the front windshield. The number of marks 21 increases as the driver tilts the grip 1 in the direction of heading one step by one step. This mark 21 does not represent a specific value indicating how many kilometers per hour the driver wants to accelerate to. Rather, this mark indicates whether the driver wants to accelerate a lot or a little.

FIG. 8B illustrates marks 21 that are displayed when the driver tilts the grip 1 by five steps in the direction of heading.

By returning the grip 1 back to the neutral position, all the marks 21 disappear.

To express the intention of heading, the driver pulls the grip 1 toward the driver, as if the driver steps on the gas pedal slowly for slow acceleration. Assume now that the speed reaches 40 km/h when the driver fully pulls the grip 1 toward the driver.

If the driver does not release the grip 1 but continues holding the grip 1 positioned at the step 5, the control unit 11 determines that the driver wants to accelerate more. When the driver releases the grip 1 or returns the grip 1 back to the neutral position, the control unit 11 determines that the driver wants to keep the current speed. When the driver pulls the grip 1 toward the driver again thereafter, the control unit 11 determines that the driver wants to accelerate faster than 40 km/h.

The action of moving the grip 1 in the direction of heading is like rowing on water with oars. A thrust force is generated by moving oars backwards in the water. When completing moving the oars backwards, the oars are raised from the water into the air, and then are dipped into the water in the traveling direction. The action of moving the oars in the air corresponds to an operation of returning the grip 1 back to the neutral position. That is to say, even after the grip 1 fully tilted toward the driver is returned back to the neutral position when the speed is 40 km/h, the car still moves at a speed of 40 km/h. That is, the returning of the grip 1 does not mean an intention of slowing down to a speed of 0 km/h.

An intention of making a left or right turn may be added to the intention of heading. What is needed for an intention of turning to the left at a curve with the current speed of 40 km/h is just to tilt the grip 1 positioned at the neutral position to the left. Then, if the next intention is to accelerate out of the curve, the driver pulls the grip 1 toward the driver with keeping the grip 1 tilted to the left, so that the control unit 11 is able to realize a driving image of creating a thrust force that cancels out the centrifugal force.

(Operation for Braking)

Figure 9A:
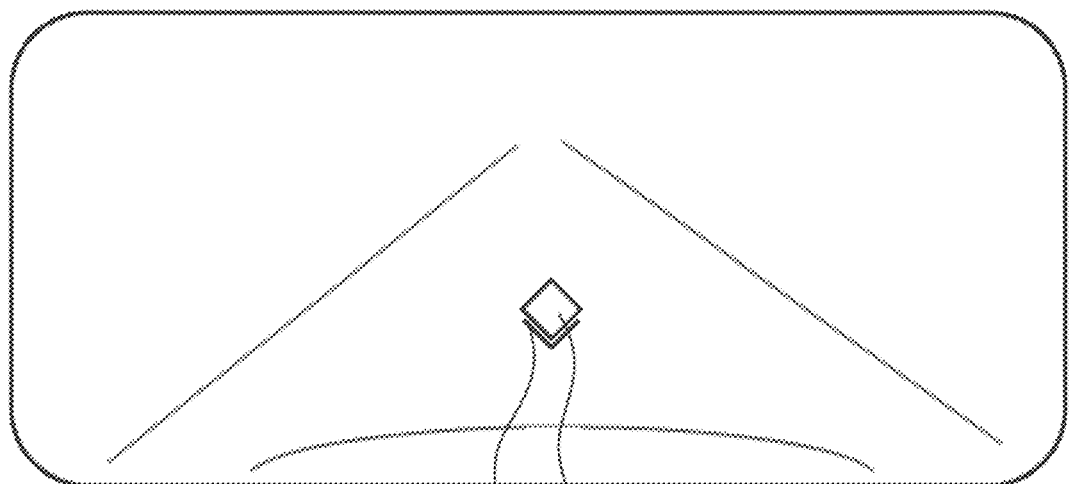
FIGS. 9A and 9B are views for explaining position mark information that is displayed on the front windshield when the grip is tilted in a direction of braking.
Figure 9B:
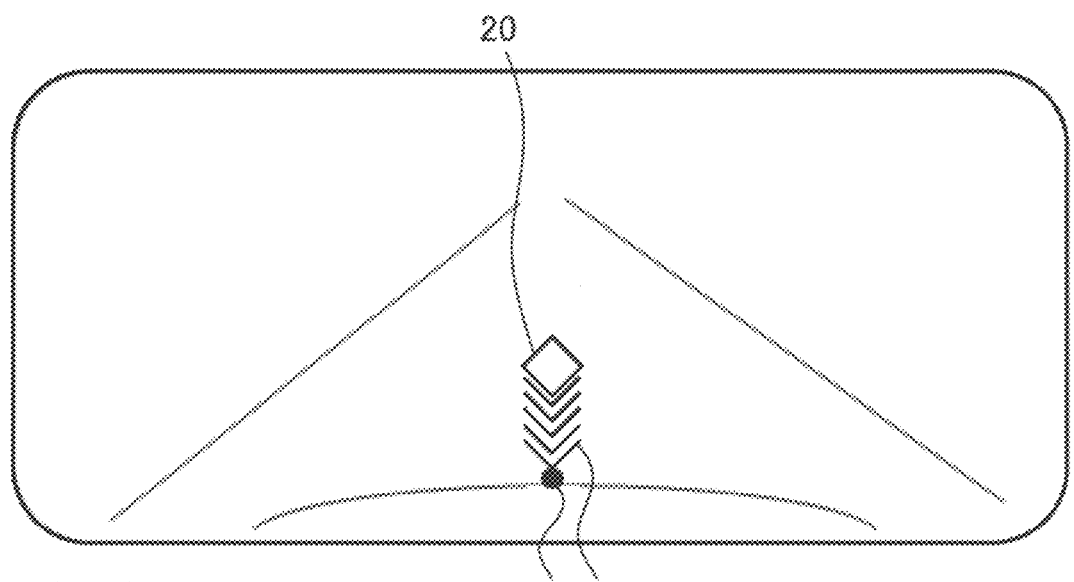

FIGS. 9A and 9B are views for explaining position mark information that is displayed on the front windshield when the grip is tilted in the direction of braking.

When the grip 1 is tilted by one step in the direction of braking, one mark 21 is displayed below the index 20 as illustrated in FIG. 9A.

The number of marks 21 increases as the driver tilts the grip 1 one step by one step in the direction of braking.

FIG. 9B illustrates marks 21 that are displayed when the driver tilts the grip 1 by five steps in the direction of braking. For example, when the driver tilts the grip 1 by five steps in the direction of braking, a black circle mark 22 is displayed in addition to the marks 21. For example, when recognizing that the traffic light in front of the driver turns red, the driver tilts the grip 1 by five steps in the direction of braking to display the marks 22, which means conveying his/her intention of stop to the control unit 11.

At this time, the passenger car 100 does not need to stop completely. By displaying the marks 22 to inform the control unit 11 in advance that the passenger car 100 will stop completely a several seconds later, the driver may omit the grip operation until the passenger car 100 reaches a stop position.

These index 20 and marks 21 and 22 are displayed at prescribed positions and in size such as not to disturb the driver's driving.

As described earlier, the grip 1 is not interlocked with an apparatus that controls driving and steering of the passenger car 100. Therefore, the tilt angle of the grip 1 is not a value that indicates the angle or force for controlling the passenger car 100.

When the driver fully tilts the grip 1 in the direction of braking, the control unit 11 determines that this indicates an intention of braking including stopping of the passenger car 100. At this time, the control unit 11 records an end point in the storage unit 12, without actually stopping the passenger car 100. When the driver releases the fully tilted grip 1 or relaxing his/her grip, the grip 1 returns back to the neutral position.

As explained above with respect to actions using oars, with respect to returning to the neutral position in the rounds of the stick for heading and braking, returning of the stick to the neutral position is not considered as human's intention of heading even though the stick moves in the direction of heading.

By the way, if the grip 1 fully tilted away is further tilted away, the control unit 11 determines that an emergency has happened. This feature is not included in conveying the intention of heading.

Passenger cars may be said to be machines to drive, and their most important function is to stop. Driving is an activity for ourselves, but stopping is related to other people's safety.

Suppose that the automated driving based on operations of the grip 1 has become normal. If an accident that is unexpected by the control unit 11 has happened, a driver is expected to step on the brake pedal in panic. However, since the driver is accustomed to driving with the use of the grip 1, what the driver can do is just to tilt the grip 1 away from the driver right away. For such a case, the following mechanism may be provided: the grip 1 fully tilted away from the driver is tiled further away to inform the control unit 11 of the emergency. Mechanically speaking, a method of providing a push button at the tip of the grip and tilting the grip 1 further away from the driver while pushing the push button may be considered. Another method might be that a lock is released by a force greater than or equal to a prescribed limit and then the grip 1 fully tilted away from the driver is tilted further away.

(Operation for Left and Right Turns)

An angle of tilting to the left or right is associated with the actual steering angles of tires.

In the case where the steering angle of front wheels (the maximum steering angle of the outer wheel) of the passenger car 100 ranges from 30 degrees to 35 degrees, for example, the tilt angle of the grip 1 may be interlocked with the steering angle.

Figure 10A:
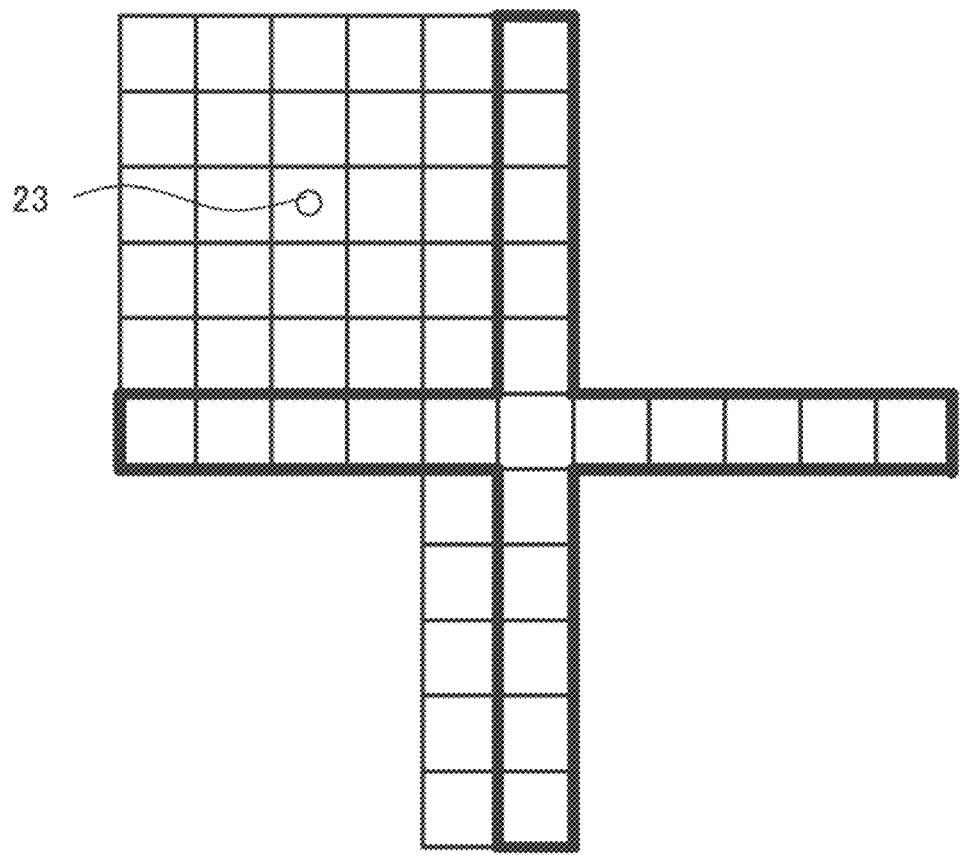
FIGS. 10A and 10B are views for explaining operation for left and right turns.
Figure 10B:
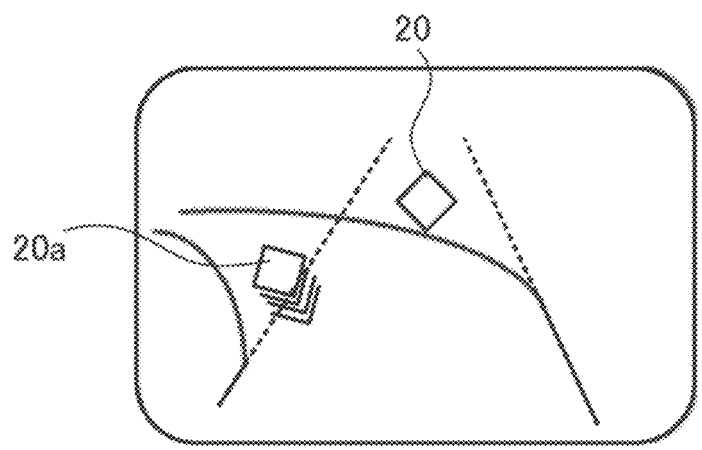

FIGS. 10A and 10B are views for explaining operation for left and right turns.

FIG. 10A illustrates the same table as FIG. 6.

A mark 23 illustrated in FIG. 10A indicates the position of the grip 1 based on a driver's intention. This indicates that the driver has an intention of turning to the left while braking.

FIG. 10B is a view for explaining information that is displayed on the front windshield.

An actual road is straight and then curved to the left.

An index 20 represents the position of a passenger car one second later. Since the control unit 11 has not performed a steering wheel operation, the index 20 is placed on a line extending from the current position of the passenger car 100 in a direction in which the passenger car 100 would travel if the driver does not operate the steering wheel. At this stage, it is recognized that the control unit 11 does not rotate the steering wheel to the left and so does not change the orientation of the car body.

Since the driver sees the road curved to the left, the driver tilts the grip 1 to the left. An index 20a indicates where the passenger car 100 will be one second after the driver conveys his/her intention by tilting the grip 1 to the left.

Figure 11A:
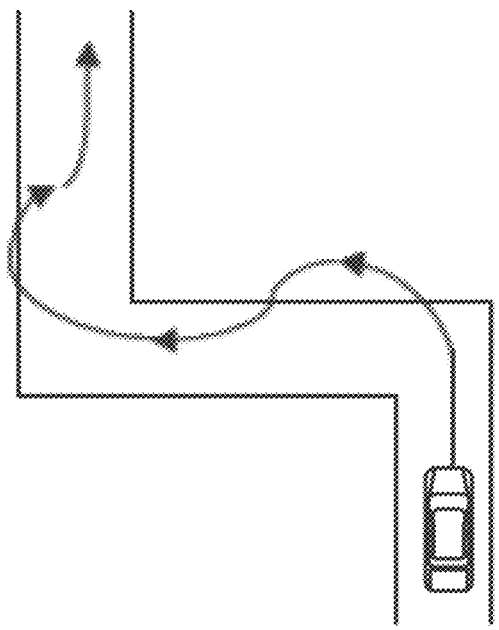
FIGS. 11A and 11B are views for explaining positional relationship of indexes.
Figure 11B:
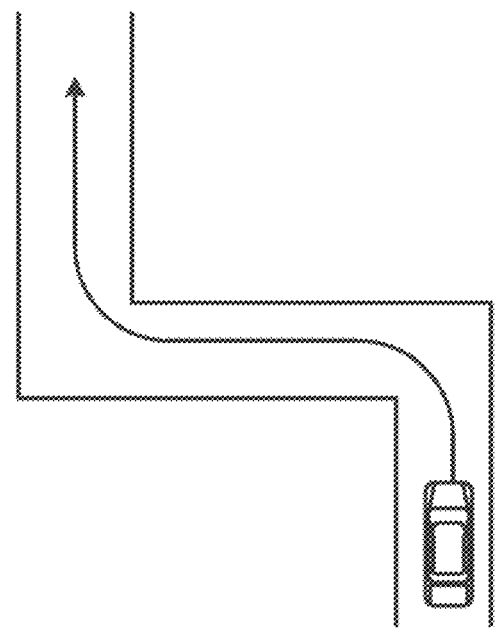

FIGS. 11A and 11B are views for explaining the positional relationship of an index.

FIG. 11A indicates a trace of the index 20 of FIG. 10B, and FIG. 11B indicates a trace of the index 20a of FIG. 10B.

Imaging certain positions of the index 20 to be displayed, the human is able to record the positions within the road on an image. This trace is done unconsciously because unconscious rotating of the steering wheel and unconscious tilting of the grip 1 are based on the same sense of manipulation for the driver.

In addition, the driver manipulates the brake and gas pedals while operating the steering wheel. A human body feels acceleration, deceleration, left turn, and right turn with a swing pressure in three semicircular canals and internal organs. The internal organs have vagus nerve, which is cranial nerve, widely distributed from the lower medulla oblongata. The vagus nerve has control over motor nerves of internal organs and parasympathetic sensory nerves. The feeling of falling while on a roller coaster comes from the vagus nerve. This feeling provides a sense of unity with a car body based on the swing pressure during operation of the grip 1. In addition, each time operating the grip 1, the driver predictively feels the swing pressure (gravitational acceleration) in any direction. By recognizing the external environment correctly and operating the grip 1 in synchronization with the movement in the center of gravity of the car body during automated driving, the driver is able to feel the sense of unity as if the driver actually drives the passenger car 100, although the driver actually does not drive the passenger car 100.

Below the index 20a in FIG. 10B, three marks are displayed. Therefore, a forward braking pressure might be placed on the driver's body. However, the numerical degree of its swing pressure is determined by the braking force actually produced by the control unit 11, and therefore is different from the swing pressure expected by the driver. These three marks just represent an intention of rotating the steering wheel to the left while braking.

The reason why such a rough sense is meaningful is because the control unit 11 sequentially measures the state of the driver's driving awareness in the form of a numerical value to be recorded, according to driver's operation.

The following describes diagrams for comparing a driver's grip operation, a steering result of the control unit 11, and a swing pressure based on the result with each other on the same table.

Figure 12:
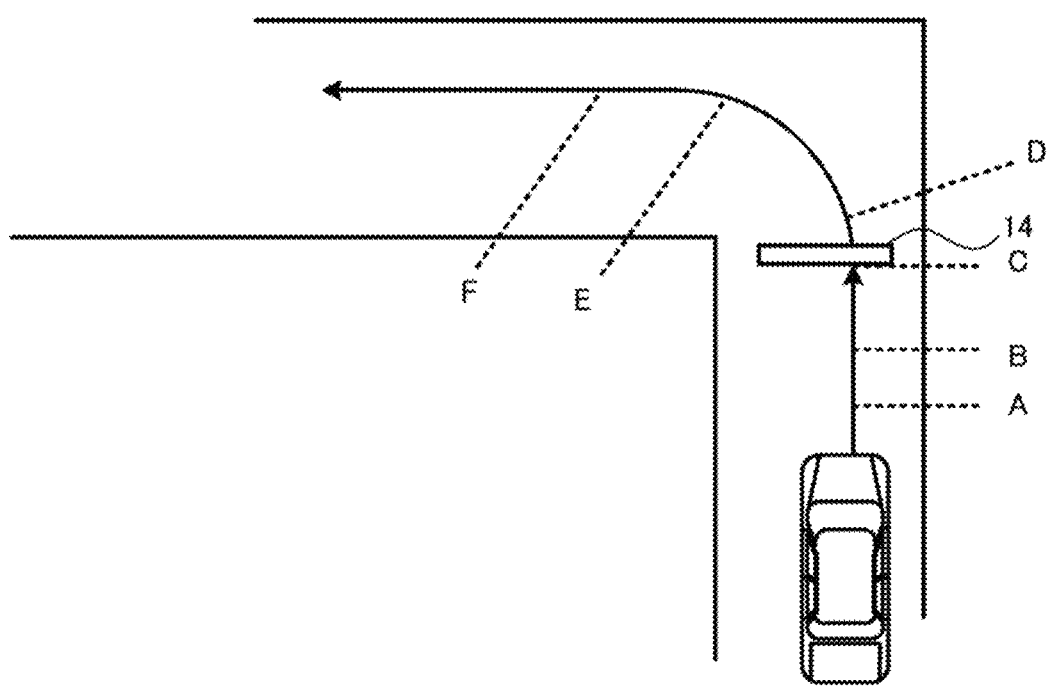
FIG. 12 is a view for explaining driving conditions.

FIG. 12 is a view for explaining driving conditions.

A position A is where the passenger car 100 drives at a fixed speed in a straight direction. The road is not rough but flat. A position B is where the passenger car 100 recognizes a stop sign 14. A position C is where the passenger car 100 temporarily stops. A position D is where the passenger car 100 accelerates and turns left. A position E is where the passenger car 100 accelerates while returning back the steering wheel.

A position F is where the passenger car 100 accelerates in a straight direction.

FIGS. 13A, 13B, 13C, 14A, 14B, and 14C are views for explaining a driver's driving intention, a swing pressure of a sensor, and driving steering of the control unit 11 at each position illustrated in FIG. 12. The driver's driving intention, the swing pressure of the sensor, and the driving steering of the control unit 11 are illustrated in order from the left in FIGS. 13A, 13B, and 13C.

FIG. 13A is a view for explaining a driver's driving intention, a swing pressure of the sensor, and driving steering of the control unit at the position A.

In this connection, as a measurement value of the Gyro sensor, a swing pressure acts in an opposite direction to an operation of the grip 1 to the left or right.

At the position A, the passenger car 100 drives at a fixed speed in the straight direction. To drive at a fixed speed, the passenger car 100 accelerates slightly. Therefore, the driving steering of the control unit 1 is in the heading state, and the Gyro sensor records a backward swing pressure. The driver's driving intention is to maintain the current speed, not acceleration or deceleration, and keep going straight, and therefore the grip 1 is at the neutral position.

As illustrated in FIG. 13B, the driver recognizes at the position B that he/she approaches the stop sign and the left-turn point. At the same time, the driver tilts the grip 1 away from the neutral position to the braking stop at once. The conditions in this example are a temporary stop, different from a stop for a traffic light, and the driver needs to stop on the straight road. To stop at the stop point, the control unit 11 starts to decelerate. At the position B, the passenger car is under braking and has not stopped. It is obvious that the driver is able to tilt the grip 1 gradually away from the driver to record the same vector as the control unit 11. However, in this case, such a grip operation is simplified by tilting the grip 1 to the stop position with one action.

Since the driver fully tilts the grip 1 away from the driver, the rule of "oars moving in the air" applies, which means that by releasing the grip 1 or relaxing the driver's grip, the grip 1 returns back to the neutral position and the stop neutral intention is recorded while the passenger car is decelerating.

As illustrated in FIG. 13C, the driver has already conveyed the stop neutral intention by the time point of the position C. However, rotating the steering wheel to the left or right may be needed on the path from the position B to the position C. In this case, a new driving intention vector is generated. At the same time, new gravitational acceleration may occur in the swing pressure. This means that a new requirement is added to the driving requirements illustrated in FIGS. 13A, 13B, and 13C in the path between the position B and the position C. Even in this case, a similarity is recorded as a relationship between driver's driving intention and swing pressure. An arrow indicating a transition from the braking state to the stop state is generated in the swing pressure and the driving control of the control unit 11 of FIG. 13C. The situation where the car body completely stops is like an image in which the "oars" of a stopped board are being placed into the water.

Figure 14A:
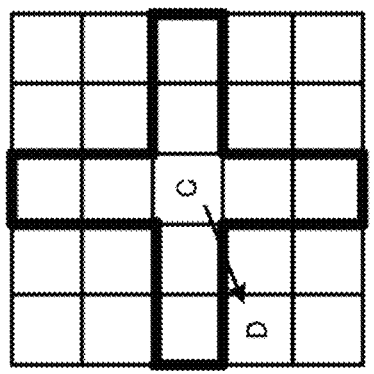
FIGS. 14A, 14B, and 14C are views for explaining a driver's driving intention, a swing pressure of the sensor, and driving steering of the control unit at each position illustrated in FIG. 12.

As illustrated in FIG. 14A, the control unit 11 rotates the steering wheel to the left while accelerating at the time point of the position D. The driver tilts the grip 1 to the left while pulling it toward the driver. A centrifugal force and thrust force in a direction opposite to the tilt direction of the grip 1 and also gravitational acceleration in the right backward direction opposite to the left-turn direction act on the swing pressure of the Gyro sensor 107a of FIG. 4.

Figure 14B:
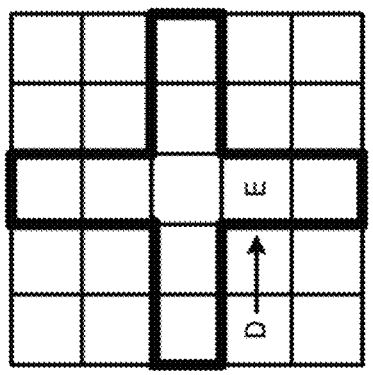
Figure 14C:
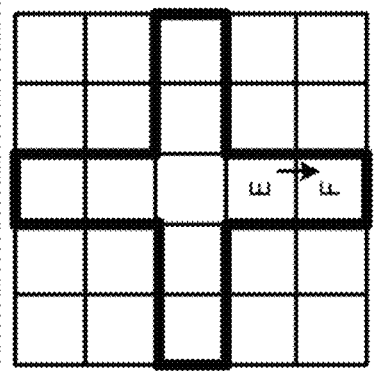

As illustrated in FIG. 14B, the front wheels are entering the exit of the curve at the time point of the position E. Therefore, the driver returns the grip 1, which has been tilted to the left, back to the left-right neutral position. In this way, a point where a movement of the grip was changed from one direction to its opposite direction is detected, and a comparison is made with the acceleration (actual swing pressure) detected at this time by the Gyro sensor 107a. Thereby, the control unit 11 measures the driver's driving awareness level, records the appropriateness of the operation in the form of values, and determines whether to give the driver an authority to control the vehicle in order to change the driving mode from the automated driving mode. The operation systems of a vehicle, which is a transportation means, include both an operation system for manual driving, including steering, acceleration, and braking, and an actuator operation system operated by an automated driving control function.

The more the driver operates the grip 1, the shorter the intervals for the measurement, the more the driving requirements to be measured, and the more the information obtained by the control unit 11 that monitors the driver. While driving on a city road, the control unit 11 is able to monitor the driver precisely. However, while driving on a monotonous road, like highway, the driving requirements decrease. That is, the control unit 11 obtains less information in monitoring the driver. Therefore, the intervals for reading a driver's driving intention become longer. Compared with the driving on a city road, the number of times a driving intention is confirmed per travel distance decreases inversely to the driving speed. That is, as the speed increases, the driver's driving awareness becomes low on measurement, which may lead to increasing dangers (death rate).

The following describes how to visualize a driving intention on the basis of operation of the grip 1.

FIG. 15 illustrates a table that has a time axis in addition to the coordinate axes of the image sensor.

Assume that a certain time (present time) is taken as time T. Driver's operations for the past two seconds before the time T are represented in the form of values in the table. Another time period, like ten seconds, may be used in place of the two seconds. A value of "2" in the Heading column indicates that the heading level is at "2".

Referring to FIG. 15, at time T, it is recognized that the driver operates the grip 1, imaging that he/she steers the vehicle straight ahead and steps on the gas pedal at the strength of "2".

By sequentially placing marks on one sheet starting at time T10, the intentions of the driver controlling the passenger car 100 in four directions may be represented on a graph including the time axis.

Figure 16:
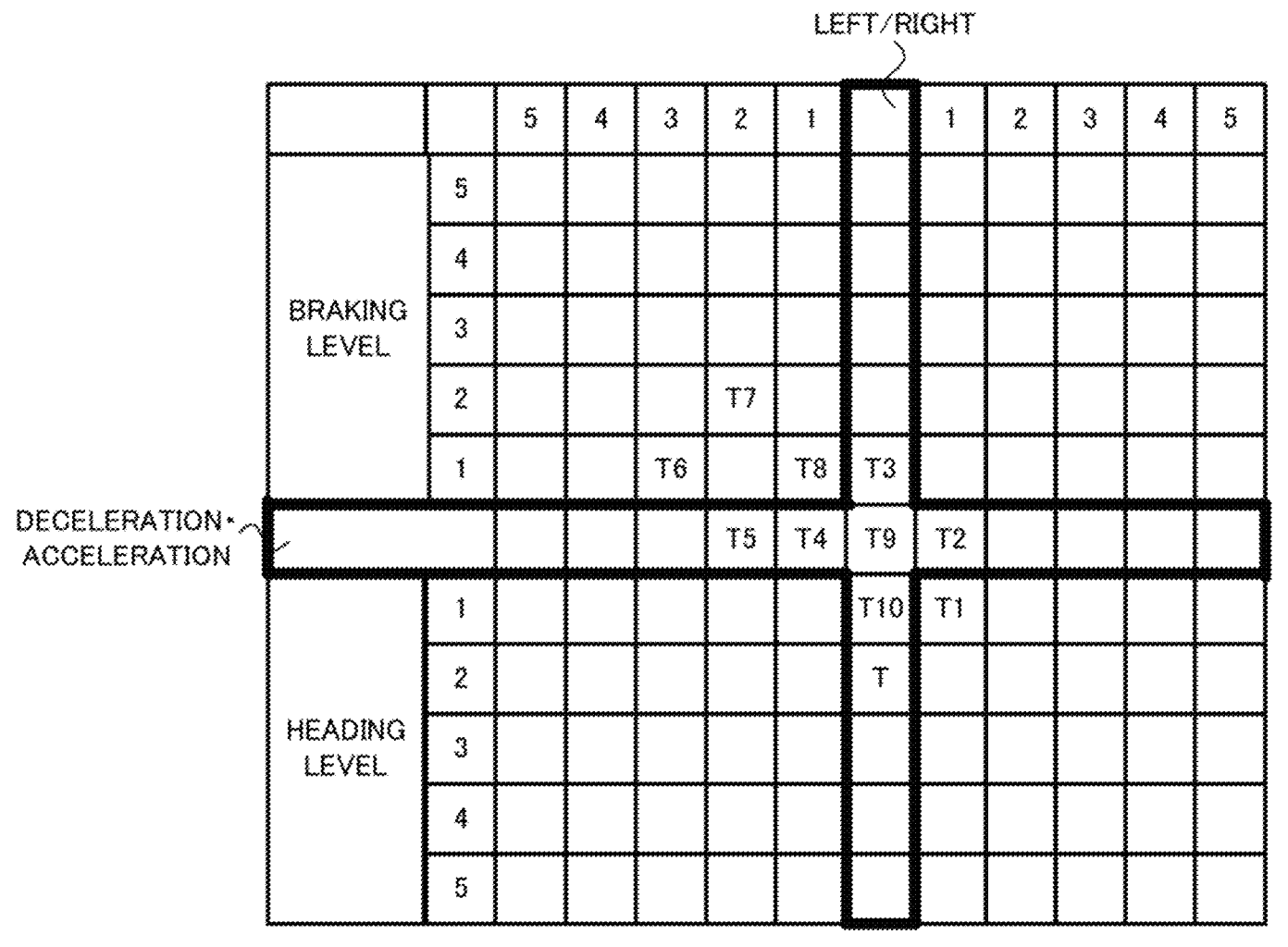

FIG. 16 illustrates positions displayed in terms of heading, braking, left-rotation, and right-rotation levels with respect to the time axis.

The view of FIG. 16 illustrates driving operating intentions imaged by the driver. It is possible to additionally insert values resulted by the passenger car 100 controlling itself, on the coordinate axes. Further, by setting the time axis in the three-dimensional coordinates, it is possible to three-dimensionally draw the driving intentions and a locus of actual operations with continuous curved lines.

The following describes a method of selecting elements for a comparison between a driver's driving intention and a driving intention by the passenger car 100 and assisting the control unit 11 that controls the passenger car 100 in the end.

For example, the movements over times T9, T8, T7, and T6 in FIG. 16 are checked. With respect to the left and right steering, i.e., the steering wheel operation, the grip 1 is tilted to the left from T9 up to T6. The time T6 is a time point at which a driving intention is changed and an operation transition is complete. That is, this time point is the end point of one intention and also serves as the start point of another intention. With respect to the heading and braking, i.e., the acceleration and braking operation, braking is performed up to T7. The time T7 is a time point at which the braking intention is changed to another intention and the operation transition is complete. That is, this time point is the end point of one intention and also serves as the start point of another intention. This case may be a case where a traffic light in front of the passenger car turns from red to green before the car stops, and so an intention of keeping on driving at the current speed without stopping at the traffic light is generated.

A point where a determined operation is changed from one to its opposite one is taken as a point where the driver's driving intention is to be compared to the control of the control unit 11. This is because it is expected that a reason of a change in driver's intention is that the driver recognizes some situations, such as braking of a car ahead, the distance to the car ahead, or a situation where no cars drive in front of the passenger car, and makes a determination based on the recognition in sensory perception.

The control unit 11 reads each zone of acceleration and deceleration based on driver's continuous determination during driving, so that the control unit 11 is able to accumulate the driver's reliability as past data.

The above method enables the control unit 11 to judge whether its own determination was an error and whether there is any information that was missing or was not able to be detected by the sensors.

In addition, the control unit 11 is able to confirm the driver's driving concentration and to degrade the performance of the passenger car 110 itself to a fallback function reduction state.

Consider the six-level automated driving classifications (SAE J3016) employed by the National Highway Traffic Safety Administration (NHTSA). If the driver feels drowsy while the control unit 11 performs the driving operation under the level 3, i.e., conditional automation, the control unit 11 issues a warning and immediately lowers the driving automation level to the level 1, and then if the control unit 11 is unable to detect a driver's grasp of the steering wheel, the control unit 11 moves to the road shoulder for an emergency stop.

In the present approach, the driver operates the grip 1 intentionally to take action against determination made under the automated driving control. For example, when the control unit 11 intends to automatically overtake another vehicle while driving under the level 4, i.e., high automation, the control unit 11 also determines whether the driver has high driving awareness. Assume that the control unit 11 determines that the driver has high driving awareness. If the control unit 11 detects the tilting of the lever by the driver in a direction of deceleration and braking when the control unit 11 is about to overtake the vehicle, the control unit is able to give up the overtaking.

As described above, in the passenger car 100 that has a control function of being able to partially or fully drive, not in accordance with intentions of a driver who monitors the transportation means, the computer 100a provided in the passenger car 100 has the grip 1 that is provided independent of the operation system of the passenger car 100 and receives driver's operating intentions according to operation of the driver who monitors the passenger car 100 while the passenger car 100 moves, and the control unit 11 that continuously measures a transition process of changing the operating intention of the driver, who monitors the passenger car 100, to a different intention via the grip 1 and determines whether to give the driver an initiative of operating the passenger car 100 on the basis of the measurement value indicating the change to the different intention.

In addition, the control unit 11 occasionally stores information on driver's driving awareness based on operation of the grip 1, in the storage unit 12, and determines whether to give the driver the operating initiative on the basis of the information on the driver's driving awareness stored in the storage unit 12.

In addition, the control unit 11 detects a point where the driver moves the grip 1 in a different direction and makes a comparison with the acceleration of the passenger car 100 obtained at the time of the detection, in order to determine whether to give the driver the operating initiative.

A result of determination by the control unit 11. With respect to a swing pressure generated in the passenger car 100 and the movement of the grip 1 made based on information recognized by the driver, their patterns of start and end points have regularity and similarity even though they have different widths, different strengths, different time lengths, different start times, and different end times.

Therefore, the passenger car 100 compares the direction and strength of gravitational acceleration that is obtained by actually controlling the passenger car 100 and a period of time taken for a transition to the driving intention entered via the grip 1 by the driver. By doing so, the passenger car 100 is able to determine whether the driver monitors the car correctly on a second-by-second basis. Therefore, the passenger car 100 is able to determine the driver's driving awareness level and use the determined driving awareness level to determine whether to give the human an authority to drive in case of emergency or another occasion.

If the driver does not continuously monitor the passenger car 100, the passenger car 100 is able to warn the driver and determine to stop the passenger car 100 in a safety zone.

Further, if the driver makes an inappropriate input or does not convey his driving intention enthusiastically to the control unit 11 of the passenger car, the control unit 11 may determine to invalidate part of the driving control function. For example, the control unit 11 does not make a determination as to whether to take an overtaking, and reduces the speed below the speed limit.

In addition, with the passenger car 100, the following effects are expected.

For deep learning, driver's intentions may additionally be recorded as position marks in collected image information.

For example, driving intention information indicating zones where lanes are often changed or other driving intention information may be indicated on a map.

When the passenger car 100 indicates an intention of overtaking, the driver is able to use the grip 1 to reply: whether to accept the intention of overtaking.

As in the manual driving, the driver needs to use the grip 1 to drive. However, it is the control unit 11 that actually drives the vehicle. The control unit 11 reads information that the driver does not notice, and drives on the basis of obstacle information read by an automated driving sensor or the like. Even if the human operates the grip 1 erroneously, the control unit 11 does not accept this erroneous intention in driving control. This enhances safety for the driver.

Conventionally, a destination is designated in advance before starting the automated driving. However, the passenger car 100 allows the driver to designate a traveling direction only with a position marker, without designating the destination. Therefore, the passenger car 100 is a vehicle that is so flexible as to drive according to driver's intentions.

The driver is able to drop in anywhere according to driver's intentions on the way to the destination. For such a detour, it is not needed to turn off the automated driving mode.

The driver is able to operate the car safely and freely with the grip 1. The grip 1 serves as a driving control operation device for the passenger car 100.

The passenger car is a vehicle that does not deny either drivers who want to enjoy driving or drivers who desire to just travel to their destinations.

Quantified driving intentions may be recorded as position marks on a video of a drive recorder that records the front view of the vehicle. In addition, control results obtained by the control unit 11 may be recorded as position mark images. As a result, two driving intentions, a human's driving intention and a driving intention of the automated driving control unit, are seen together in one driving video of the front view of the vehicle. The storage unit 12 always records two images after starting the engine of the vehicle. At the same time, the control unit 11 evaluates a driving intention image, using route determination made by the automated driving control unit as a first criterion. The evaluation result is stored in the storage unit 12. The evaluation method includes the following evaluation criteria: whether the driving follows the traffic rules; whether the position marks are placed at appropriate positions considering the width of roads and traffic lane lines; whether the distance to another passing car is appropriate; and whether the timing of starting and stopping is appropriate.

Further, the ratio of accumulated added points and accumulated deduction points exceeds a prescribed value, the driver's level is increased to be an excellent driver level. A driver with an excellent score on driving intentions is able to hold the position mark of the automated driving control unit displayed in the driving video. Refer now to FIG. 16. The driver operates the grip 1 according to external conditions from time to time. At the same time, the driver feels a related swing pressure. The control unit of the automated driving car sends a command to generate the swing pressure to the operation device. This command value is determined by previously predicting a future position of the own vehicle a prescribed time later. This predicted position (position mark) is generated under the conditions where a danger is prevented, based on a dynamic map, sensor information, and others. When the driver operates the grip 1 from T1 to T10 of FIG. 16, the control unit of the automated driving car itself generates a position mark and controls the vehicle by using the actuator on the basis of the position. If the position mark operated by the human and the position mark generated by the control unit of the automated driving car always overlap and move (based on the sense of the three semicircular canals and vagus nerve), the control determination of the human is judged excellent. Under this condition, the grip 1 is given an authority to hold and move the position mark of the automated driving control unit, and moves it in a direction desired by the human. The control unit 11 is able to send a command value to the operation device on the basis of the position mark of the automated driving control moved by the human. As a result, the vehicle is controlled by the grip 1 that is not interlocked with the operation device. Even in this case, the principle of lawful and safety control is followed. The above approach makes it possible to freely change the traveling route even to a stopover other than a destination set in the car navigation system.

In addition, a traffic lane may desirably be selected, as in the manual driving. For example, avoiding heavy traffic at the entrance of a parking area by making a lane change, the driver is able to prevent stress that may occur due to automated driving.

If the driver does not convey his/her driving intentions to the control unit 11 at all, the program being executed carries out the safety driving and stops the vehicle. For example, it is possible to guide the car to a service parking area on highway, to lead the car to a parking area in a city, or to stop the car at the shoulder of a road whose width is larger than or equal to a prescribed width.

Further, it may be needed for traffic safety to convey driving intentions to surrounding vehicles and others. Driving intentions of the control unit 11, driving intentions of the driver, or the driving intentions of both may be conveyed to the outside.

In addition, the above data and the quantized data obtained by the driver tilting the grip 1 may be displayed on the front or rear body or registration plates of the passenger car 100 with visible light, in order to convey these data to surrounding vehicles. Alternatively, such data may be transmitted to the surrounding vehicles with radio communications. If a road is highway or another that has a few driving requirements, the driver is able to select a target of attention on a road or in a surrounding area using the grip 1 on the basis of his/her human senses and inform the control unit 11 of this target.

In this connection, the driver or the third party may be informed of the control status of the control unit 11 and driver's intentions. For example, the control status of the control unit 11 and a driver's intention may be displayed on the registration plates mounted on the front and rear sides of the passenger car 100.

Further, an image in which two driving intentions, i.e., a human's driving intention and a driving intention by the automated driving control unit, are indicated may be synthesized as an image with one driving video for deep learning, which is needed for realization of automated driving cars. This image indicates position marks. Position marks obtained by the driver's actual operation are inserted in a training image. A heading intention and a braking intention appear as position marks.

The driving program for automated driving cars is generated with deep learning. As "correct" data to be used for the learning, images taken by a vehicle that a skilled driver drives may be used. In this approach, images in which position marks with respect to the above two driving intentions, and braking scene or heading scene are inserted are able to be synthesized with taken images.

An image at the time of heading intention is used in positive training, and an image at the time of braking intention is used in negative training. If a video, which always changes scenes, is stopped, the video turns to a still image. If a time axis is not included in still images, it is not possible to determine whether an image is of heading or braking. The heading intention and the braking intention are recorded as still images in position marks. Visual image information on external environment displays elements that are needed for the two kinds of driving. A process of extracting and classifying feature values on the basis of data including correct determination given as scores is performed.

That is, the driver is a teacher for supervised learning and teaches an edge for safety and an edge for danger to the control unit 11.

As a result of the above method, the level concepts in the automated driving are changed. The subject of driving is changed from the passenger car 100 to the driver. For example, the following levels are considered.

Level 0: The driver fully controls a manual driving apparatus as the driver desires.

Level 1.1: The driver monitors the entire automated system.

Level 1.2: The driver is monitored by the entire automated system.

Level 1.3: The driver always interacts with the entire automated system and entrusts the automated system with his/her desired control.

Level 2: The driver follows the entire automated system.

Second Embodiment

The following describes a passenger car according to a second embodiment.

Different features of the passenger car of the second embodiment from the above-described first embodiment will mainly be described, and the same features thereof will be omitted.

Figure 17:
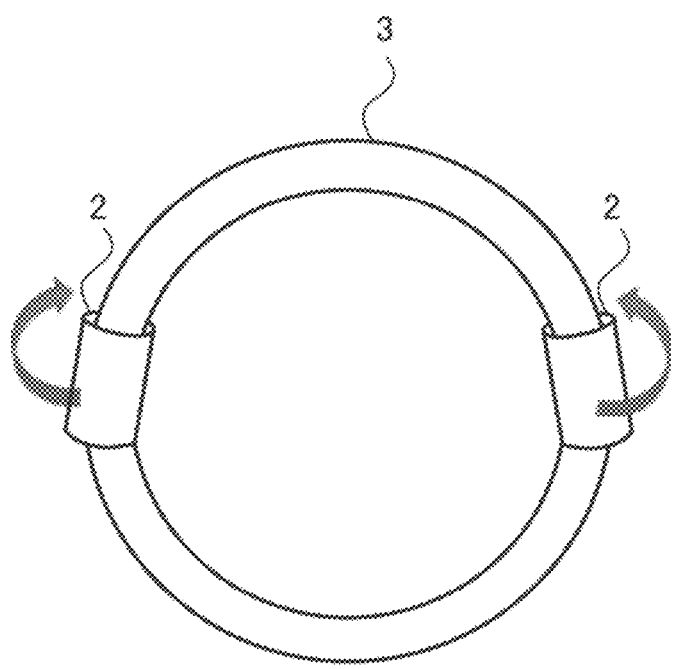
FIG. 17 is a view for explaining an operation unit according to a second embodiment.

FIG. 17 is a view for explaining an operation unit according to the second embodiment.

In the passenger car of the second embodiment, a grip 2 whose function is partially the same as that of the grip 1 is attached to a steering wheel 3.

The grip 2 attached to the left or right side of the steering wheel 3 illustrated in FIG. 17 provides the outer rotation (in the arrow direction in FIG. 17) for braking and the inner rotation for heading. On the other hand, the grip 2 attached to the bottom side thereof provides the inner rotation for braking and the outer rotation for heading.

Such a rotation pipe mounted at the steering wheel enables the driver to convey only acceleration and deceleration intentions among driver's driving intentions to the control unit 11. While doing a long drive on monotonous highway, the driver conveys only acceleration and deceleration intentions to the control unit 11. The highway has clear white lines on the roadside. Control in the left and right directions is precise and involves concentration. At the corner, placing the driver's hands on the steering wheel would be better to make an immediate action. Although information density is less, the driver is able to convey his/her awareness level to the control unit 11 in real time each time he/she has a speed control intention due to, for example, the distance to an adjacent car, an up and down in the road, an interruption of a vehicle from a fast lane, or another.

The passenger car of the second embodiment provides the same effects as the passenger car 100 of the first embodiment.

In addition, the passenger car of the second embodiment reduces information that the driver reads and judges during driving on highway and causes the driver to concentrate on one point, i.e., acceleration and deceleration.

The following describes how to increase recognition judgment information per driving distance.

Third Embodiment

The following describes an operation unit according to a third embodiment.

With respect to the operation unit of the third embodiment, the differential features from the first embodiment (driving assistance apparatus and driving assistance method thereof) will mainly be described, and the same features will not be described again.

Figure 18A:
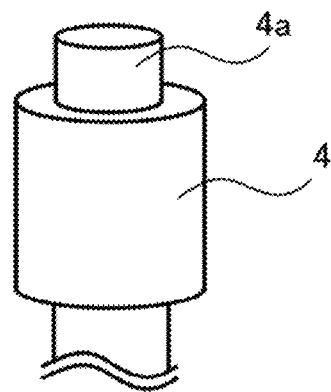
FIGS. 18A and 18B are views for explaining a grip according to a third embodiment.
Figure 18B:
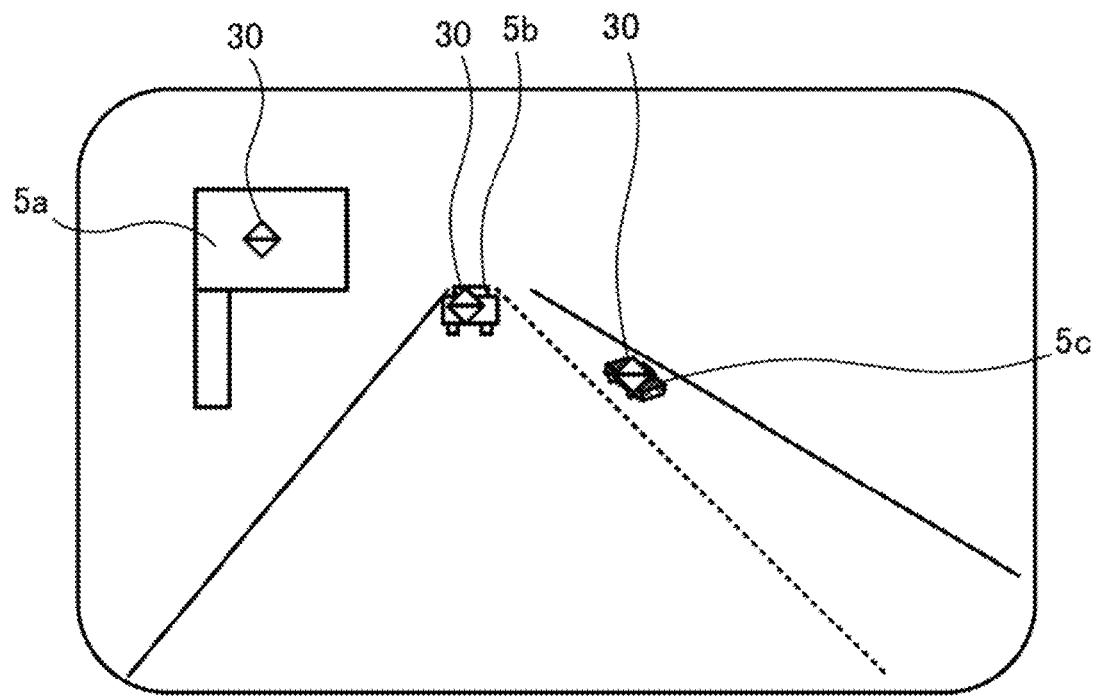

FIGS. 18A and 18B are views for explaining a grip according to the third embodiment.

The grip 4 of the third embodiment has the same functions as the grip 1. In addition, a driver is able to move the grip 4 forward, backward, to the left, and to the right to desirably move the position of a mark 30 displayed on a front windshield.

In addition, the grip 4 has a button 4a that is a lock button for the mark 30.

The driver is able to send attention information to the control unit 11 by placing the mark 30 onto a target that needs to be paid attention to during driving and then pressing the button 4a.

FIG. 18B illustrates an example where three marks 30 are placed at a sign 5a, a vehicle 5b ahead in the same driving lane, and a vehicle 5c ahead in the overtaking lane. The number of marks 30 is not limited and, for example, only one mark may be displayed on the front windshield.

It is a pain for a driver who keeps a fixed posture during a long drive on highway. For example, the driver keeps on pressing the gas pedal with his/her right foot while adjusting the speed. Automated driving may be desired for some reasons including escaping from such physical restraint. However, what is important is to understand that driving on highway increases the danger level in an accelerated manner due to the weight and speed of a vehicle. A video that shows a passenger vehicle of nearly two tons flying in the air, like a leaf, is fresh in our memory.

The use of the above-described grip 1 would not be an element that enhances safety in highway driving that decreases driving requirements. While driving on highway, the driver needs to pay more attention. The driver may think that automated car allows the driver to take a nap. However, the driver needs to give up such an imagination, because not only automated cars but also manual-driving cars always drive side-by-side on highway. In the case where highway is an area allowing both automated driving and manual driving, the driver using the above grip 1 needs to confirm surrounding safety more than the drivers of the manual-driving cars. Designating an element of attention with a mark 30 is an action that is not taken for the manual-driving cars. In addition, to enhance safety, it is effective to attach the mark 30 to a vehicle overtaking from behind. The use of a liquid crystal touch panel to display thereon an image captured by the rear image pickup camera enables the driver to touch an image of the overtaking car with a finger. By a human driver designating a target that needs to be paid attention to at present, the control unit is able to share information on this target of attention with the human driver. The control unit is able to monitor the designated target of attention without fail and to take it as a direct element to determine the driving speed, driving lane, execution or non-execution of overtaking.

Example

The following describes a specific example of driving using the passenger car 100 of the embodiments.

Now consider what kind of automobile society is created with such passenger cars 100. Assume a country that employs right-side driving.

A driver gets on a car for work in the morning. The driver designates, as a destination, his office registered in the car navigation system. The driver pulls the grip 1 toward the driver and exits from a parking lot to a narrow road with sidewalk. Before entering the sidewalk, the driver fully tilts the grip 1 away from the driver for a temporary stop. Then, after confirming that no one is around, the driver tilts the grip 1 to the right while pulling it toward the driver. The driver tilts the grip 1 so that the top of the grip 1 faces a desired turn direction. When the front part of the vehicle enters the right lane of the small road, the driver gradually returns the grip 1 to the left-right neutral position while moving. A traffic light at an intersection with a main road is red. The car stops before a zebra. The driver has already fully tilted the grip 1 away from the driver once to show his/her stop intention. Although the traffic light is red, the driver is allowed to turn right after confirming safety in the case of turning right. The main road has three lanes on each side. After confirming no car is coming from the left side, the driver starts to drive to the outermost lane at a dash. Then, the driver returns the grip 1 to the neutral position while rotationally tilting it to the right and toward the driver. The driver notices a stopping school bus immediately after the car body faces in the traveling direction. Many cars in the middle lane pass by the school bus from left behind. The passenger car 100 stops behind the bus due to the determination by the control unit 11. Then, the driver tilts the grip 1 to the left to inform the control unit 11 of his/her intention to change lanes to the left lane. The control unit 11 reads the intention and waits for interruption of cars using a rear sensor. At this time, the traffic light at the intersection turns red. The control unit 11 confirms no car is coming from left behind and steers to the left to enter the middle lane. By this time point, the control unit 11 has measured the position of the temporary stop, the timing of acceleration and deceleration, and intentions of left and right turns entered by the driver via the grip 1. The appropriateness of these operations is displayed in an indicator on a dashboard. The reliability of the driving car is evaluated to be 80%. A delay in recognition of the school bus and a delay in determination for the temporary stop cause a deduction of points. It is no wonder that there are kids around the school bus.

The driver is going to a bypass road between cities soon. The driver tilts the grip 1 to the left for directing to the flowing road, to thereby inform the control unit 11 of the direction. The passenger car 100 is able to get into a high-speed mode when the speed exceeds 70 km/h. The driver holds an acceleration and deceleration input pipe at the lower central part of the steering wheel with his left hand. The driver holds the grip 1 with his right hand. The grip 1 may be configured so as to be risen from an armrest according to driver's preference. If the driver likes to operate the grip 1 with his left hand, he pulls out the left armrest. When the speed exceeds 70 km/h, the driver is able to pull a trigger attached to the grip 1. A mark 30 is projected on the front windshield. The driver is able to move the mark 30 on a point of attention in the external environment by moving the grip 1 while pulling the trigger. The driver presses the button 4a in a situation where the mark 30 is placed on the target, such as a vehicle ahead or a traffic sign. It is needless to say that the control unit 11 monitors the point of attention thereafter.

At present, the control unit 11 actually steers, accelerates, and decelerates. However, it is not sure that this completely matches a driver's driving intention. The driver may deny overtaking proposed by the control unit 11. The control unit 11 makes an attempt to enhance safety by comparing each other's driving intentions. Both driving intentions are always displayed on lawful metal registration plates. LED emitters are embedded in the registration plates, and both of the driving intentions currently monitored by the control unit 11 are displayed on the registration plates attached to the front and rear sides of the car body. It is possible to cooperate with passenger cars driving in the front of and behind the car with the light emitters and radio communications.

After arriving the office, the driver notices that he has not operated the steering wheel, brake pedal or gas pedal. He would remember that there might be no steering wheel in a cockpit where a superhero he read in his youth in a magazine controls driving. He also would remember that there might be only one control stick in the cockpit.

Heretofore, the driving assistance apparatus and driving assistance method have been described through the embodiments illustrated. The invention is not limited thereto, and the components of each unit may be replaced with other components having equivalent functions or other components. In addition, other desired configurations and steps may be added to the invention.

Further, two or more desired configurations (features) in the above-described embodiments may be combined.

The above-described processing functions may be implemented by using a computer. In this case, a program is prepared, which describes processes for the functions of the passenger car 100. A computer implements the above-described processing functions by executing the program. The program describing the intended processes may be recorded on a computer-readable recording medium. Computer-readable recording media include magnetic storage devices, optical discs, magneto-optical recording media, semiconductor memories, etc. The magnetic storage devices include HDDs, flexible disks (FDs), magnetic tapes, etc. The optical discs include DVDs, DVD-RAMs, CD-ROMs, CD-RWs, etc. The magneto-optical recording media include magneto-optical disks (MOs), etc.

To distribute the program, portable recording media, such as DVDs and CD-ROMs, on which the program is recorded, may be put on sale. Alternatively, the program may be stored in the storage device of a server computer and may be transferred from the server computer to other computers over a network.

A computer which is to execute the above program stores in its local storage device the program recorded on a portable recording medium or transferred from the server computer, for example. Then, the computer reads the program from the local storage device, and runs the program. The computer may run the program directly from the portable recording medium. Also, while receiving the program being transferred from the server computer over a network, the computer may sequentially run this program.

In addition, the above-described processing functions may also be implemented wholly or partly by using digital signal processor (DSP), application-specific integrated circuit (ASIC), programmable logic device (PLD), or other electronic circuits.

According to one aspect, criteria are provided for giving an operating initiative to a driver while a transportation means moves.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A driving assistance apparatus provided in a transportation entity that has a control function of being able to partially or fully drive, not in accordance with an operating intention of a driver who monitors the transportation entity, the driving assistance apparatus comprising:
an operation unit that is operated by the driver to express the operating intention, wherein the operation unit is separate and distinct from an operating system that actually operates the transportation entity using an actuator and is provided independently of the operating system, and the operation unit is configured to receive the operating intention of the driver according to operation of the driver while the transportation entity moves under automated driving control, the operating intention including at least one of left steering, right steering, heading, braking, stopping and keeping on driving of the transportation entity, the operation unit including a neutral position; and
a control unit that is configured to continuously measure a transition process of changing the operating intention of the driver to a different intention via the operation unit, and to determine whether to give the driver an initiative of actually operating the transportation entity, based on a measurement value indicating a change to the different intention, wherein:
the operation unit is further configured to notify the control unit of, as the operating intention of the driver,
an increase in an intention of the driver to accelerate the transportation entity as a number of steps by which the driver tilts the operation unit in a direction of the heading increases,
an intention of the braking including the stopping of the transportation entity in response to a tilting of the operation unit in a direction of the braking,
an intention of the left steering or the right steering of the transportation entity in response to the tilting of the operation unit in a direction of left or right, and
an intention of accelerating the transportation entity out of a curve in response to the tilting of the operation unit in a direction of the heading with keeping the operation unit tilted to the left or the right;
the control unit is further configured to determine that
the driver has an intention of keeping a current speed upon recognizing that the operation unit stays at the neutral position while the transportation entity is accelerating,
the driver has an intention of keeping a current speed and keeping going straight when the operation unit is kept at the neutral position of the left steering, the right steering, the heading and the braking,
a returning of the operation unit from the direction of the heading to the neutral position does not mean an intention of slowing down to a speed of 0 km/h, and
a returning of the operation unit from the direction of the braking to the neutral position does not mean an intention of the heading;
the control unit continuously measures a start point and an end point of the transition process of changing the operating intention of the driver to the different intention according to the operation of the operation unit operated by the driver while the transportation entity moves under the automated driving control controlled by the control unit without being controlled by the operation of the operation unit operated by the driver;
the control unit determines whether to give the driver the initiative of actually operating the transportation entity based on the reliability of the driver accumulated as the past data;
the operation unit operated by the driver is given an authority to move the transportation entity and the transportation entity is controlled by the operation unit, wherein the operation unit is separate and distinct from the operating system that actually operates the transportation entity using the actuator and is provided independently of the operating system, in a case where:
when the reliability of the driver does not exceed a prescribed value, the control unit determines to invalidate a part of a driving control function; or
when the driver having the reliability exceeding the prescribed value tilts the operation unit in a direction of braking, the control unit determines that an emergency has happened and stops the transportation entity.

2. The driving assistance apparatus according to claim 1, wherein the control unit sequentially stores information on driving awareness of the driver, based on operation of the operation unit in a storage unit, and determines whether to give the driver the initiative, based on the information on the driving awareness of the driver, stored in the storage unit.

3. The driving assistance apparatus according to claim 1, wherein the control unit
records a direction angle of the transportation entity set by the driver using the operation unit and a point where an intention of the driver was changed.

4. The driving assistance apparatus according to claim 1, wherein:
the control unit generates a position mark image indicating a future position where the transportation entity will reach after prescribed seconds in a direction in which the driver desires to move, based on a driving speed of the transportation entity and a steering angle, the position mark image moving in a traveling direction;
the driver of the transportation entity enters a driving intention including a start point and an end point of moving the operation unit forward, backward, to left, or to right, based on determination made from recognition, prediction, or physical feeling of the driver; and
the control unit
adds, to the position mark image, a driving intention image that indicates determination made by the driver to move the transportation entity forward, backward, to left, or to right, the determination being entered using the operation unit,
synthesizes the position mark image with a driving image that is readable for artificial intelligence, and
adds, to a machine learning data set image that is readable for the artificial intelligence, an attribute and label indicating a driving intention of moving the transportation entity forward, backward, to left, or to right.

5. A control method for a transportation entity that has a control function of being able to partially or fully drive, not in accordance with an operating intention of a driver who monitors the transportation entity, the control method comprising:
receiving, by a computer, via an operation unit that is operated by the driver to express the operating intention, the operating intention of the driver according to operation of the driver while the transportation entity moves under automated driving control, wherein the operation unit is separate and distinct from an operating system that actually operates the transportation entity using an actuator and is provided independently of the operating system, the operating intention including at least one of left steering, right steering, heading, braking, stopping and keeping on driving of the transportation entity, the operation unit including a neutral position;

continuously measuring, by the computer, a transition process of changing the operating intention of the driver to a different intention via the operation unit; and determining, by the computer, whether to give the driver an initiative of actually operating the transportation entity, based on a measurement value indicating a change to the different intention, wherein:

the operating intention of the driver the computer receives indicates
- an increase in an intention of the driver to accelerate the transportation entity as a number of steps by which the driver tilts the operation unit in a direction of the heading increases,
- an intention of the braking including the stopping of the transportation entity when the driver tilts the operation unit in a direction of the braking,
- an intention of the left steering or the right steering of the transportation entity when the driver tilts the operation unit in a direction of left or right, and
- an intention of accelerating the transportation entity out of a curve when the driver tilts the operation unit in a direction of the heading with keeping the operation unit tilted to the left or the right;

the method further includes
- determining by the computer that the driver has an intention of keeping a current speed upon recognizing that the operation unit stays at the neutral position while the transportation entity is accelerating,
- determining by the computer that the driver has an intention of keeping a current speed and keeping going straight when the operation unit is kept at the neutral position of the left steering, the right steering, the heading and the braking,
- determining by the computer that a returning of the operation unit from the direction of the heading to the neutral position does not mean an intention of slowing down to a speed of 0 km/h, and
- determining by the computer that a returning of the operation unit from the direction of the braking to the neutral position does not mean an intention of the heading;

the continuously measuring includes continuously measuring a start point and an end point of the transition process of changing the operating intention of the driver to the different intention according to the operation of the operation unit operated by the driver while the transportation entity moves under the automated driving control controlled by the control unit without being controlled by the operation of the operation unit operated by the driver;

the determining whether to give the driver an initiative includes determining whether to give the driver the initiative of actually operating the transportation entity based on reliability of the driver accumulated as the past data;

the operation unit operated by the driver is given an authority to move the transportation entity and the transportation entity is controlled by the operation unit, wherein the operation unit is separate and distinct from the operating system that actually operates the transportation entity using the actuator and is provided independently of the operating system, in a case where:
- when the reliability of the driver does not exceed a prescribed value, the control unit determines to invalidate a part of a driving control function; or
- when the driver having the reliability exceeding the prescribed value tilts the operation unit in a direction of braking, the control unit determines that an emergency has happened and stops the transportation entity.

6. A non-transitory computer-readable recording medium storing a computer program that is implemented in a transportation entity that has a function of being able to partially or fully drive, not in accordance with an operating intention of a driver who monitors the transportation entity, the computer program causing a computer to perform a process comprising:

receiving, via an operation unit that is operated by the driver to express the operating intention, the operating intention of the driver according to operation of the driver while the transportation entity moves under automated driving control, wherein the operation unit is separate and distinct from an operating system that actually operates the transportation entity using an actuator and is provided independently of the operating system, the operating intention including at least one of left steering, right steering, heading, braking, stopping and keeping on driving of the transportation entity, the operation unit including a neutral position;

continuously measuring a transition process of changing the operating intention of the driver to a different intention via the operation unit; and determining whether to give the driver an initiative of actually operating the transportation entity, based on a measurement value indicating a change to the different intention, wherein:

the operating intention of the driver received indicates
- an increase in an intention of the driver to accelerate the transportation entity as a number of steps by which the driver tilts the operation unit in a direction of the heading increases,
- an intention of the braking including the stopping of the transportation entity when the driver tilts the operation unit in a direction of the braking,
- an intention of the left steering or the right steering of the transportation entity when the driver tilts the operation unit in a direction of left or right, and
- an intention of accelerating the transportation entity out of a curve when the driver tilts the operation unit in a direction of the heading with keeping the operation unit tilted to the left or the right;

the process further includes
- determining that the driver has an intention of keeping a current speed upon recognizing that the operation unit stays at the neutral position while the transportation entity is accelerating,
- determining that the driver has an intention of keeping a current speed and keeping going straight when the operation unit is kept at the neutral position of the left steering, the right steering, the heading and the braking,
- determining that a returning of the operation unit from the direction of the heading to the neutral position does not mean an intention of slowing down to a speed of 0 km/h, and determining that a returning of the operation unit from the direction of the braking to the neutral position does not mean an intention of the heading;

the continuously measuring includes continuously measuring a start point and an end point of the transition process of changing the operating intention of the operation unit operated by the driver to the different intention according to the operation of the driver while the transportation entity moves under the automated driving control controlled by the control unit without being controlled by the operation of the operation unit operated by the driver;

the determining whether to give the driver an initiative includes determining whether to give the driver the initiative of actually operating the transportation entity based on reliability of the driver accumulated as the past data;

the operation unit operated by the driver is given an authority to move the transportation entity and the transportation entity is controlled by the operation unit, wherein the operation unit is separate and distinct from the operating system that actually operates the transportation entity using the actuator and is provided independently of the operating system, in a case where:

when the reliability of the driver does not exceed a prescribed value, the control unit determines to invalidate a part of a driving control function; or when the driver having the reliability exceeding the prescribed value tilts the operation unit in a direction of braking, the control unit determines that an emergency has happened and stops the transportation entity.

* * * * *